(12) United States Patent
Dawson et al.

(10) Patent No.: US 9,254,866 B2
(45) Date of Patent: Feb. 9, 2016

(54) METHOD OF CONTROLLING STEERING OF A GROUND VEHICLE

(71) Applicants: GM GLOBAL TECHNOLOGY OPERATIONS LLC, Detroit, MI (US); The United States of America as Represented by the Administrator of the National Aeronautics and Space Administration, Washington, DC (US)

(72) Inventors: Andrew D. Dawson, League City, TX (US); William J. Bluethmann, Houston, TX (US); Chunhao J. Lee, Troy, MI (US); Robert L. Vitale, Macomb Township, MI (US); Raymond Guo, Seabrook, TX (US); Venkata Prasad Atluri, Farmington Hills, MI (US)

(73) Assignees: GM Global Technology Operations LLC, Detroit, MI (US); The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 147 days.

(21) Appl. No.: 14/075,262

(22) Filed: Nov. 8, 2013

(65) Prior Publication Data

US 2015/0134202 A1 May 14, 2015

(51) Int. Cl.
*B62D 7/14* (2006.01)
*B62D 7/15* (2006.01)
*B60W 10/20* (2006.01)

(52) U.S. Cl.
CPC ............... *B62D 7/1509* (2013.01); *B62D 7/14* (2013.01); *B60W 10/20* (2013.01); *B62D 7/1581* (2013.01)

(58) Field of Classification Search
CPC ....... B60W 10/20; B62D 7/14; B62D 7/1509; B62D 7/1581
See application file for complete search history.

(56) References Cited

U.S. PATENT DOCUMENTS

| | | | | |
|---|---|---|---|---|
| 5,379,220 A * | 1/1995 | Allen | ................... | B62D 7/1509 180/415 |
| 6,424,054 B1 * | 7/2002 | Onnen | ................. | B62D 7/1509 307/9.1 |
| 6,871,125 B2 * | 3/2005 | Oshima | ............... | B60L 15/2036 180/204 |
| 7,278,511 B1 * | 10/2007 | Gass | ................... | B62D 7/1509 180/409 |
| 7,316,288 B1 * | 1/2008 | Bennett | ................ | B62D 7/1509 180/204 |
| 8,036,793 B2 * | 10/2011 | Auguet | .................. | B62D 7/159 701/1 |
| 8,046,132 B2 * | 10/2011 | Auguet | .................. | B62D 7/159 180/415 |
| 2001/0038246 A1 * | 11/2001 | Frenza | ................. | B62D 7/1509 307/10.1 |
| 2002/0038171 A1 * | 3/2002 | Deguchi | ................ | B62D 7/159 701/41 |
| 2004/0230361 A1 * | 11/2004 | Oshima | ............... | B62D 7/1509 701/69 |

(Continued)

*Primary Examiner* — John Q Nguyen
*Assistant Examiner* — Michael Whalen
(74) *Attorney, Agent, or Firm* — Quinn Law Group, PLLC

(57) ABSTRACT

A method of controlling steering of a vehicle through setting wheel angles of a plurality of modular electronic corner assemblies (eModules) is provided. The method includes receiving a driving mode selected from a mode selection menu. A position of a steering input device is determined in a master controller. A velocity of the vehicle is determined, in the master controller, when the determined position of the steering input device is near center. A drive mode request corresponding to the selected driving mode to the plurality of steering controllers is transmitted to the master controller. A required steering angle of each of the plurality of eModules is determined, in the master controller, as a function of the determined position of the steering input device, the determined velocity of the vehicle, and the selected first driving mode. The eModules are set to the respective determined steering angles.

14 Claims, 15 Drawing Sheets

(56) References Cited

U.S. PATENT DOCUMENTS

| | | | |
|---|---|---|---|
| 2005/0096830 A1* | 5/2005 | Ohta | B60K 28/165 701/91 |
| 2007/0021875 A1* | 1/2007 | Naik | B60K 17/356 701/1 |
| 2010/0286872 A1* | 11/2010 | Endo | B62D 7/159 701/41 |
| 2012/0041644 A1* | 2/2012 | Turner | B62D 15/024 701/41 |
| 2012/0041658 A1* | 2/2012 | Turner | B62D 15/0215 701/68 |

* cited by examiner

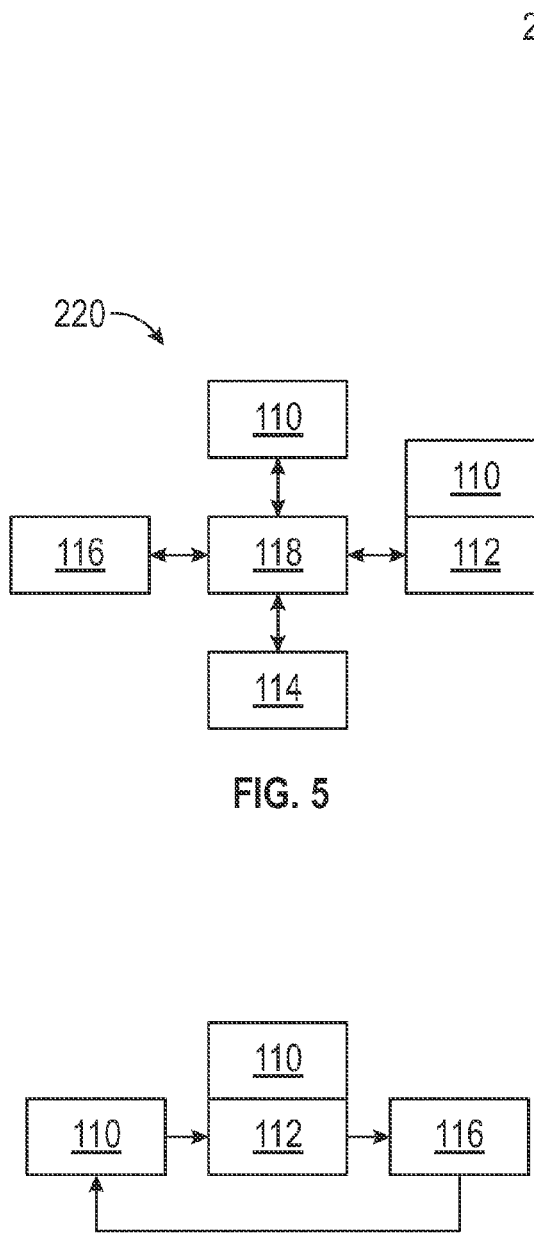
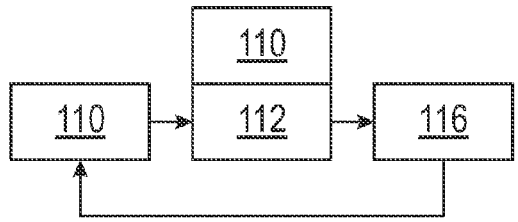
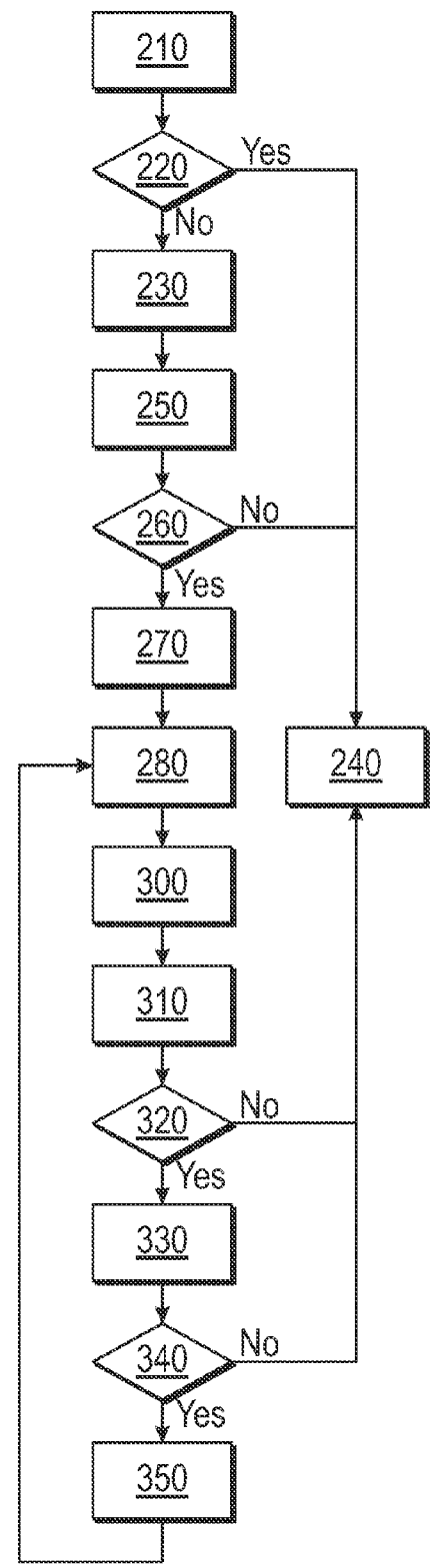

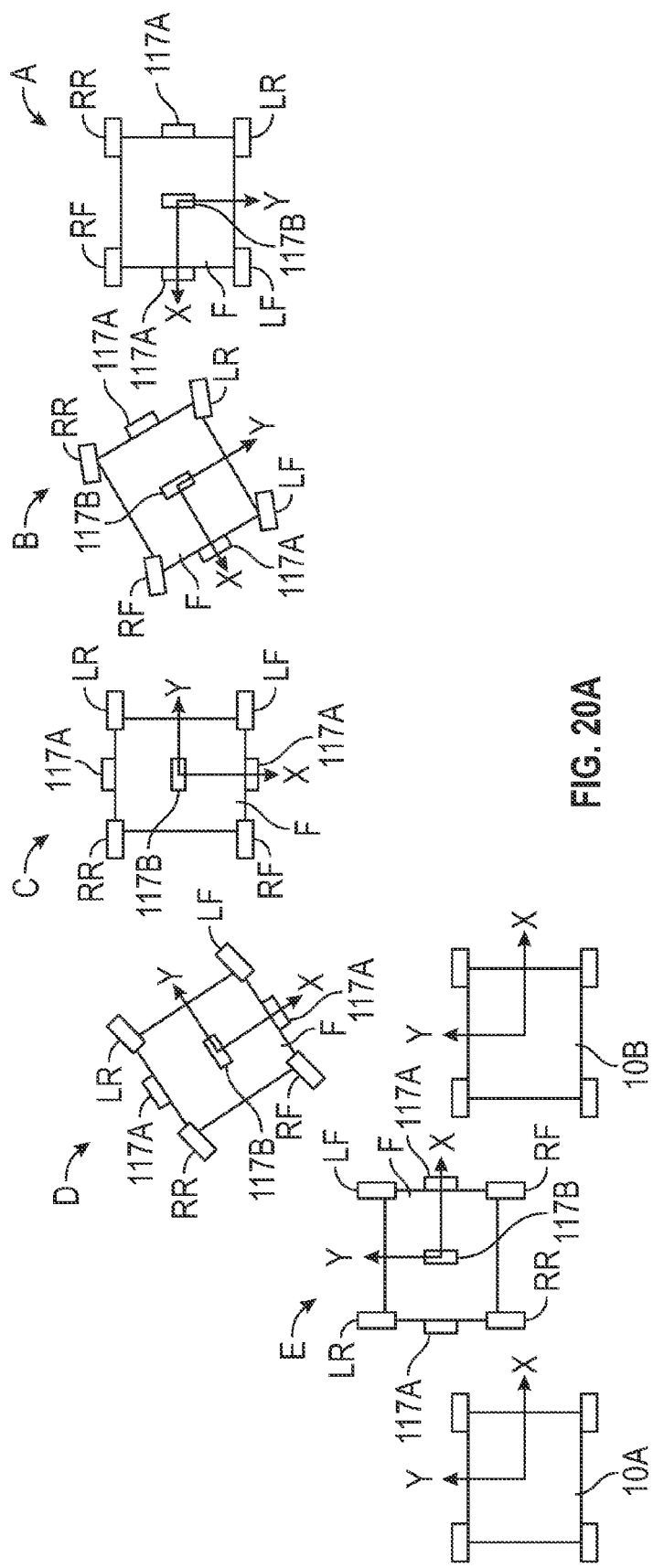
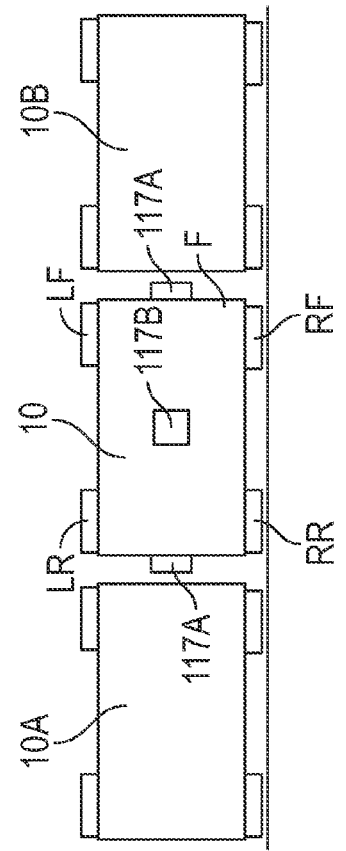
FIG. 20A
FIG. 20B

METHOD OF CONTROLLING STEERING OF A GROUND VEHICLE

STATEMENT REGARDING FEDERALLY SPONSORED RESEARCH OR DEVELOPMENT

This invention was made with government support under NASA Space Act Agreement number SAA-EA-10-017. The invention described herein may be manufactured and used by or for the U.S. Government for U.S. Government (i.e., non-commercial) purposes without the payment of royalties thereon or therefor.

TECHNICAL FIELD

The present disclosure is related to a method of controlling steering of a vehicle.

BACKGROUND

An ideal vehicle design for a driver who is commuting within a congested area might be a relatively small, fuel efficient vehicle that is easy to maneuver and park. However, on other occasions, the same driver may wish to transport multiple passengers and/or cargo, or may wish to operate in different drive modes. For such a driver, a conventional vehicle chassis and powertrain, having a fixed configuration and mechanically coupled steering, braking, and propulsion systems, may be less than optimal.

SUMMARY

A modular robotic vehicle is disclosed herein. The vehicle is electrically driven, via by-wire commands, using energy from a high-voltage battery pack and an associated power electronics module. The vehicle is controlled by way of a distributed control network having a primary and secondary master controller and multiple embedded control modules, with each control module having a corresponding steering, propulsion, and braking control task for a given corner of the vehicle. Multiple levels of control redundancy are provided, e.g., with multiple control modules used to ensure a "fail safe" backup for operationally critical functions.

Additionally, each corner of the vehicle includes a modular, self-contained "eModule", housing electric steering, propulsion, braking, and suspension subsystems. Independent control of each eModule is supervised by the primary and secondary master controllers, with the various control modules embedded within the eModules communicating as needed with the master controller via Ethernet for Control Automation Technology (EtherCAT), control area network (CAN) bus, or another suitable high-speed connection.

Driver input commands are received by the master controller from various devices, such as a steering wheel and/or joystick, a brake pedal, an accelerator pedal, and a human machine interface (HMI) screen or touchpad. These electrical input signals are transmitted to the primary and secondary master controllers. The primary and secondary master controllers then determine the driver's desired control response, and issue individual commands to each of the control modules embedded within the eModules that are affected by the driver inputs. The entire control operation is by-wire as noted above, i.e., lacking a direct mechanical linkage between the driver input devices and the steering, propulsion, or braking subsystems being controlled in response to the driver's inputs.

One possible aspect of the disclosure provides a method of controlling steering of a vehicle through setting wheel angles of a plurality of modular electronic corner assemblies (eModules) relative to a chassis. The method includes receiving a driving mode selected from a mode selection menu. A position of a steering input device is determined in a master controller. A velocity of the vehicle is determined, in the master controller, when the determined position of the steering input device is near center. A drive mode request corresponding to the selected driving mode is transmitted to a plurality of steering controllers. A required steering angle of each of the plurality of eModules is determined, in the master controller, as a function of the determined position of the steering input device, the determined velocity of the vehicle, and the selected first driving mode. The eModules are set to the respective determined steering angles.

In another aspect of the disclosure, a method of controlling steering of a vehicle through setting wheel angles of a plurality of eModules, relative to a chassis is provided. The method includes activating a mode selection menu. A driving mode selected from the mode selection menu is received. A master controller determines the position of a steering input device and a velocity of the vehicle. The wheel angle for each of the eModules is determined as a function of the selected driving mode, the position of the steering input device, and the determined velocity of the vehicle. The determined wheel angles are transmitted for each of the plurality of eModules to a respective steering controller.

In yet another aspect of the disclosure, a method of controlling steering of a vehicle through setting wheel angles of a plurality of eModules relative to a chassis is provided. The method includes activating a mode selection menu and receiving a selected first driving mode selected from the mode selection menu. A master controller determines when a brake pedal is activated. A first drive mode request corresponding to the selected first driving mode is transmitted to a plurality of steering controllers when the brake pedal is determined to be activated. Each of the steering controllers corresponds to a respective eModule.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 5 is an example flow chart of a method of selecting steering modes when the vehicle is stopped.

FIG. 6 is another example flow chart for a method of selecting steering modes when the vehicle is in motion.

FIG. 7 is yet another example flow chart for a method of selecting steering modes for the vehicle.

FIGS. 20A and 20B are schematic diagrammatic views of the vehicle illustrating a parallel parking maneuver between two other vehicles using omni-directional steering.

DETAILED DESCRIPTION

Figure 1:
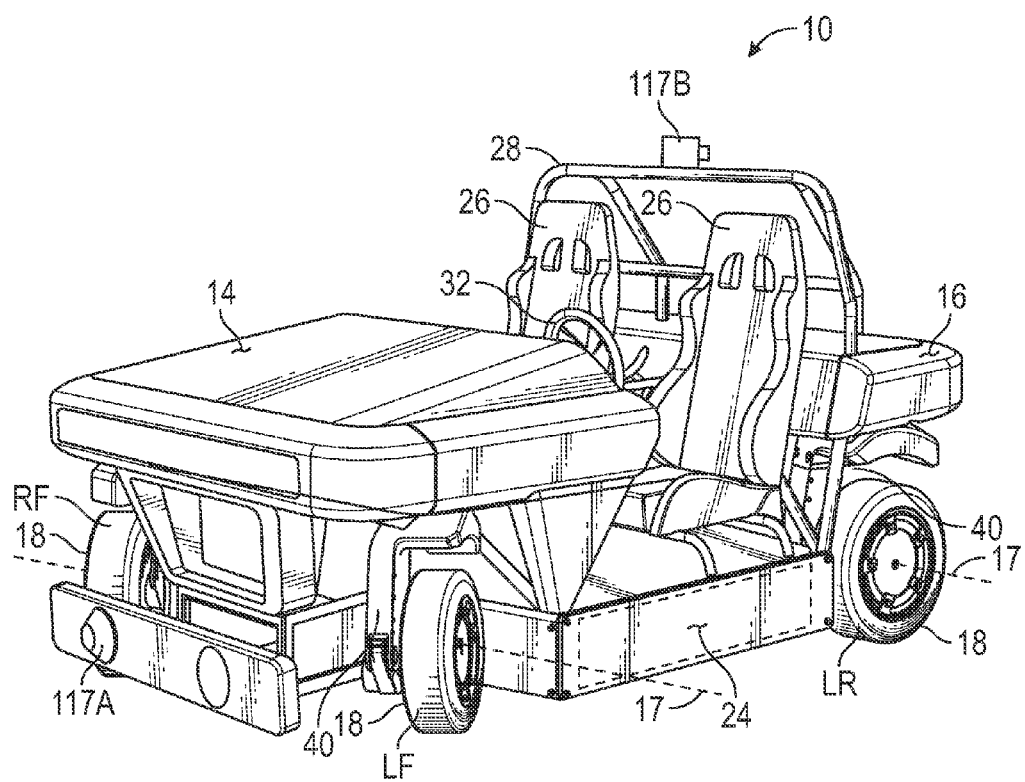
FIG. 1 is a schematic perspective side view illustration of an example modular vehicle.
Figure 2:
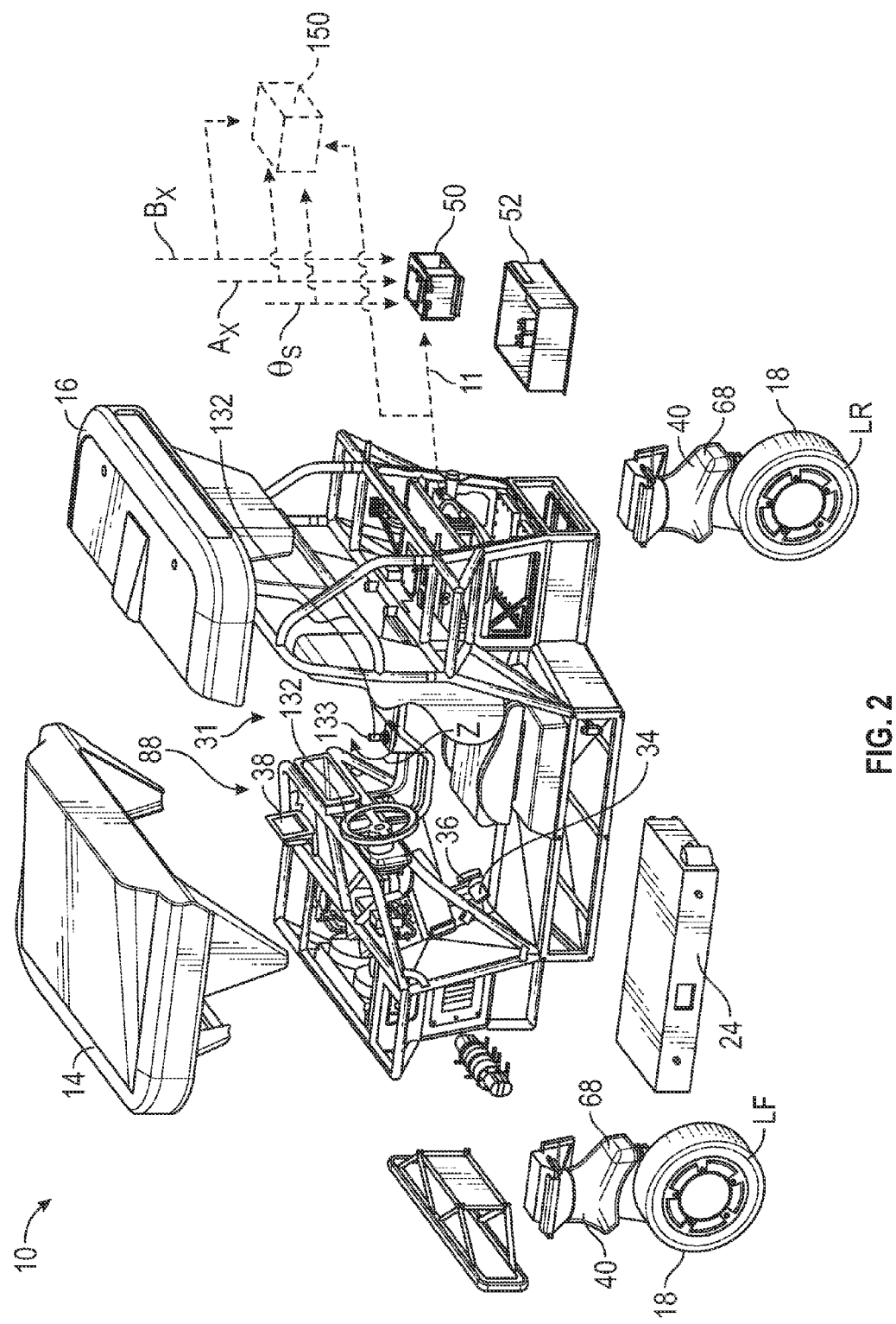
FIG. 2 is a schematic exploded view illustration of the vehicle shown in FIG. 1.

Referring to the drawings, wherein like reference numbers refer to like components throughout the several Figures, an example modular robotic vehicle 10 is shown schematically in FIGS. 1 and 2. The term "modular" as used herein refers to the modularity of design of the vehicle 10 as a whole, i.e., with the vehicle 10 being divided into multiple independently and/or interdependently controlled electromechanical subsystems or modular components, each of which can be disconnected from or connected, to the vehicle 10 as needed to establish a desired functional drive configuration.

A particular modular component providing a foundation to the design set forth herein is a self-contained electric corner assembly or "eModule" 40, with one eModule 40 being positioned at each corner of the vehicle 10, i.e., a left front (LF) 25, a right front (RF) 27, a left rear (LR) 29, and a right rear (RR) 30 of the vehicle 10. Each eModule 40 includes a drive wheel 18. A typical four-wheel design as shown in FIG. 1 has four eModules 40. However, it should be appreciated that the vehicle 10 may have more or less eModules 40 than shown and described herein without departing from the intended scope of the disclosure. The basic design and functionality of the eModules 40 is described in further detail below with reference to FIGS. 3 and 4. The vehicle 10 includes a primary master controller 50 and a secondary master controller 150. The eModules 40, as with all components of the vehicle 10, may be driven solely via electrical power from a high-voltage energy storage system (ESS) 24 and an onboard battery management system (BMS) 52, shown in FIG. 2. Overall control supervision is provided via the primary master controller 50 and/or the secondary master controller 150, as shown in FIGS. 3, 6, and 7, and explained in more detail below.

Figure 3:
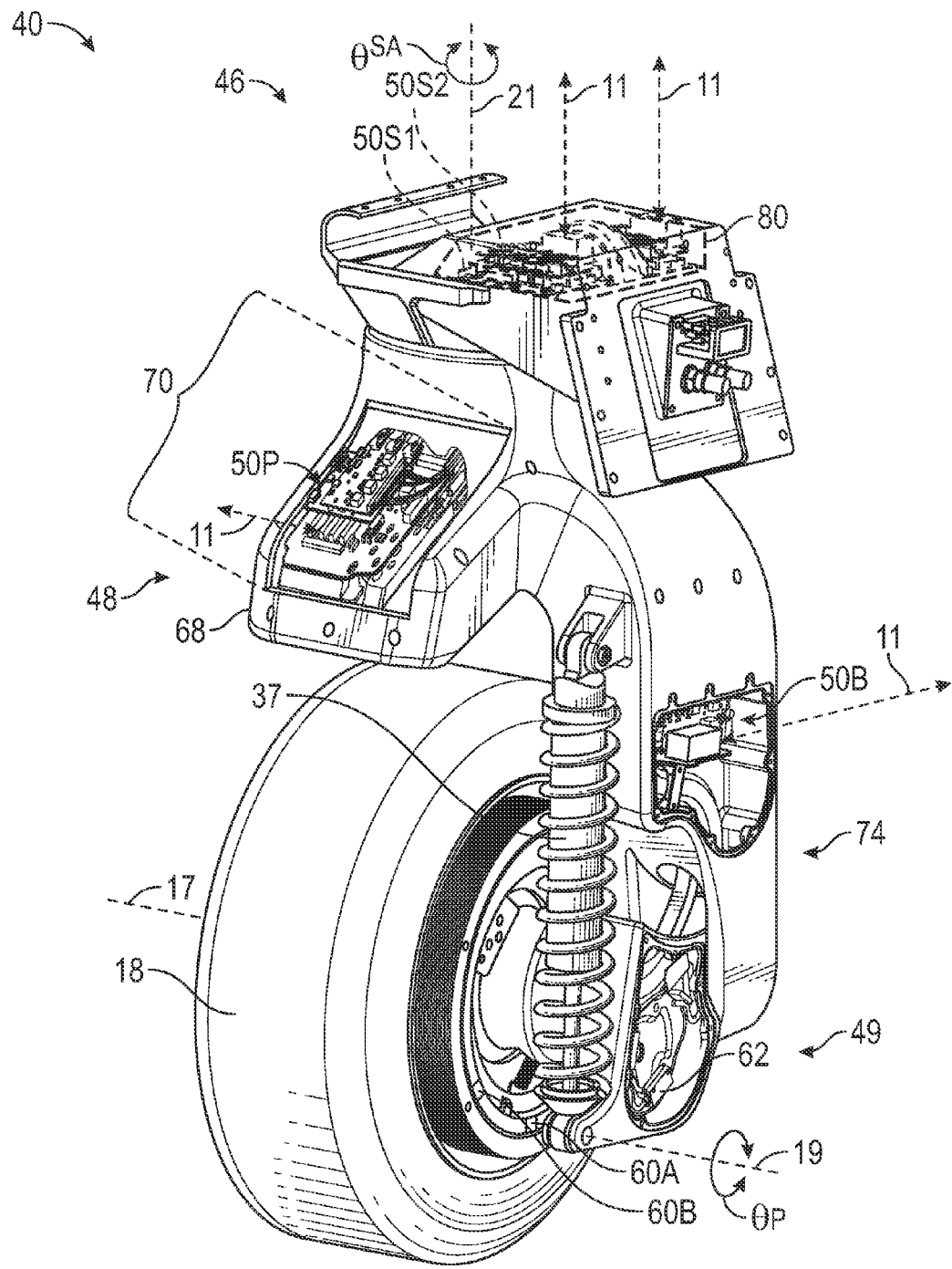
FIG. 3 is a schematic perspective side view illustration of an example modular eModule usable with the vehicle shown in FIGS. 1 and 2.

Referring to FIG. 3, each eModule 40 includes a steering module 46, a propulsion module 48, a braking module 49, and a communications module (not shown). As such, there is a control system embedded within the LF 25 eModule 40, the RF 27 eModule 40, the LR 29 eModule 40, and the RR 30 eModule 40.

The steering module 46 is configured for directing steering of the respective eModule 40, as will be explained in more detail below. The steering module 46 includes a first and a second steering controller 50S1, 50S2 and a first and second steering sensor 58A, 58B, i.e., encoder read head. Functional redundancy within the steering module 46 is enabled via the use of the first and second steering controllers 50S1, 50S2, as shown in FIG. 3. The first and second steering sensors 58A, 58B each redundantly measure and output the steering angle (arrow $\theta_{SA}$) to a corresponding one of the first and second steering controllers 50S1, 50S2. Therefore, each of these steering controllers 50S1, 50S2 receives the steering angle (arrow $\theta_{SA}$) from a corresponding one of the first and second steering sensors 58A, 58B. The first and second steering controllers 50S1, 50S2 are explained in more detail below.

Referring to FIG. 3, the propulsion module 48 is configured for directing propulsion of the eModule 40 and for determining wheel speed of the vehicle 10. The propulsion module 48 includes a propulsion controller 50P and a first and a second propulsion sensor 60A, 60B or encoder. The first and second propulsion sensors 60A, 60B, which are shown schematically in FIG. 3, provide rotational positional information of the respective wheel 18. The first and second propulsion sensors 60A, 60B may include any suitable sensor capable of providing rotational positional information.

Referring to FIG. 3, the braking module 49 is configured for directing braking of the eModule. The braking module 49 includes a braking controller 50B and a braking sensor 62. The braking sensor 62 is shown schematically in FIG. 3. The braking controller 50B is used at each eModule 40 to independently control the respective braking at the various eModules 40. More specifically, with reference to FIG. 3, the braking sensor 62 may include, but not be limited to, an encoder disc and read head, which are operable to identify a rotational position of an output shaft (now shown) of a brake actuator (not shown). As such, the braking controller 50B controls the engagement and disengagement of brake shoes (not shown) within the eModule 40, through all levels of wear of the brake shoes. Accordingly, the brake system does not require any mechanisms for adjusting slack in the brake system caused by wear of the brake shoes.

The communications module is configured for communicating between each of the primary and secondary master controllers 50, 150 and the corresponding steering, propulsion, and braking modules 46, 48, 49.

Referring again to FIG. 1, the vehicle 10 of FIG. 1 also includes a chassis 12 to which is attached a front and a rear body shell 14 and 16, respectively. The chassis 12 may be formed from a lattice of interconnected tubular frame pieces, e.g., steel, aluminum, or fiberglass tubing. The structure of the chassis 12 can also be used to help secure the eModules 40 to the chassis 12.

Further with respect to FIG. 1, each drive wheel 18 is individually powered by the corresponding propulsion module 48 and braking module 49 contained within a hub 96 or center structure of the drive wheel 18. The propulsion module 48 is configured to propel the vehicle 10 by causing the corresponding wheel 18 to rotate about a wheel axis 17. More specifically, the propulsion controller 50P is configured to receive a command from the primary and/or secondary master controller 50, 150 and, in turn, send a signal to energize a corresponding electric wheel motor (not shown). While omitted from the Figures for added simplicity, each eModule 40 may include a brake assembly. The brake assembly may include a brake drum that may be used with a pair of diametrically-opposed brake shoes, each of which includes a friction surface that is operable to engage a radial inner surface of the brake drum. An electric brake motor, also omitted, may be used to move the brake shoes into engagement with the drum when braking is commanded by a driver of the vehicle 10.

Referring to FIG. 2, the vehicle 10 is controlled via driver commands as received by multiple driver interface devices 31. These devices collectively determine a driver's desired control response, and in turn provide associated control signals to the primary master controller 50, which is shown schematically in FIG. 2, for the purpose of establishing reliable, fault-tolerant by-wire control of all steering, propulsion, and braking functions. The noted driver interface devices 31 may include a steering input device, shown here as a conventional steering wheel 32 and an optional joystick 132, an accelerator pedal 34, a brake pedal 36, a human-machine interface (HMI) screen 38, e.g., a touch screen, and a dashboard display device 88, and the like. Other driver interface devices may be envisioned without departing from the intended inventive scope. In some embodiments, the functions of the steering wheel 32 as well as that of the pedals 34 and 36 may be performed via the joystick 132.

Referring to FIG. 2, the vehicle 10 is shown in exploded view to illustrate some of the modules and associated components noted above. Sensors (not shown) may be positioned with respect to the accelerator and brake pedals 34 and 36, respectively, and used to measure the amount of travel and/or force as corresponding accelerator pedal signals ($A_X$) and brake pedal signals ($B_X$). Similarly, a steering angle sensor may be positioned with respect to the steering input device 32 and used to measure the steering angle ($\theta_S$). Calculated changes in the measured steering angle over time determine the steering rate ($\omega_S$). Other control inputs (arrow 11) from the HMI screen 38 such as a selected drive/steering mode and/or heating, ventilation, and air conditioning (HVAC) settings, etc., as well as the various signals $A_X$, $B_X$, $\theta_S$, and $\omega_S$, are communicated to the primary and secondary master controllers 50, 150, which ultimately coordinates all control actions on board the vehicle 10. For functional redundancy, as described above, the secondary master controller 150 may be used in conjunction with the primary master controller 50, with the secondary master controller 150 receiving the same set of signals. As described above, in the event of an unexpected logic fault, for instance, the secondary master controller 150 can continue to provide the core control functionality of the vehicle 10.

Referring to FIG. 3, the eModule 40 is configured to house all of the embedded controllers used for control of that particular corner of the vehicle 10, i.e., the propulsion controller 50P, the steering controllers 50S1, 50S2, and the brake controller 50B. To serve this function, the eModule 40 is provided with a housing 68, having an upper portion 70 and a lower portion 74, with the controllers 50P, 50S1, 50S2, 50B disposed therein.

The first and second steering controllers 50S1, 50S2, positioned with respect to the upper portion 70, locally control the steering function of the respective eModule 40. As described above, the two steering controllers 50S1, 50S2 may be used for functional redundancy over all steering functions. While omitted for simplicity, the upper portion 70 may include a removable access cover which provides direct access to the steering controllers 50S1, 50S2. A suspension assembly having a spring and damper assembly 37 are housed within or connected to the lower portion 74, e.g., electronics, wiring, conduit, and encoders (not shown) as needed for measuring and communicating information pertaining to the orientation of the drive wheel 18 with respect to a pivot axis 19 (see FIG. 4). The steering and propulsion controllers 50S1, 50S2, and 50P, respectively, are in communication with the primary and secondary master controllers 50, 150, shown in FIGS. 1 and 2, and programmed and equipped to perform local tasks in response to instructions from the primary or secondary master controller 50, 150 of FIG. 2.

Figure 4:
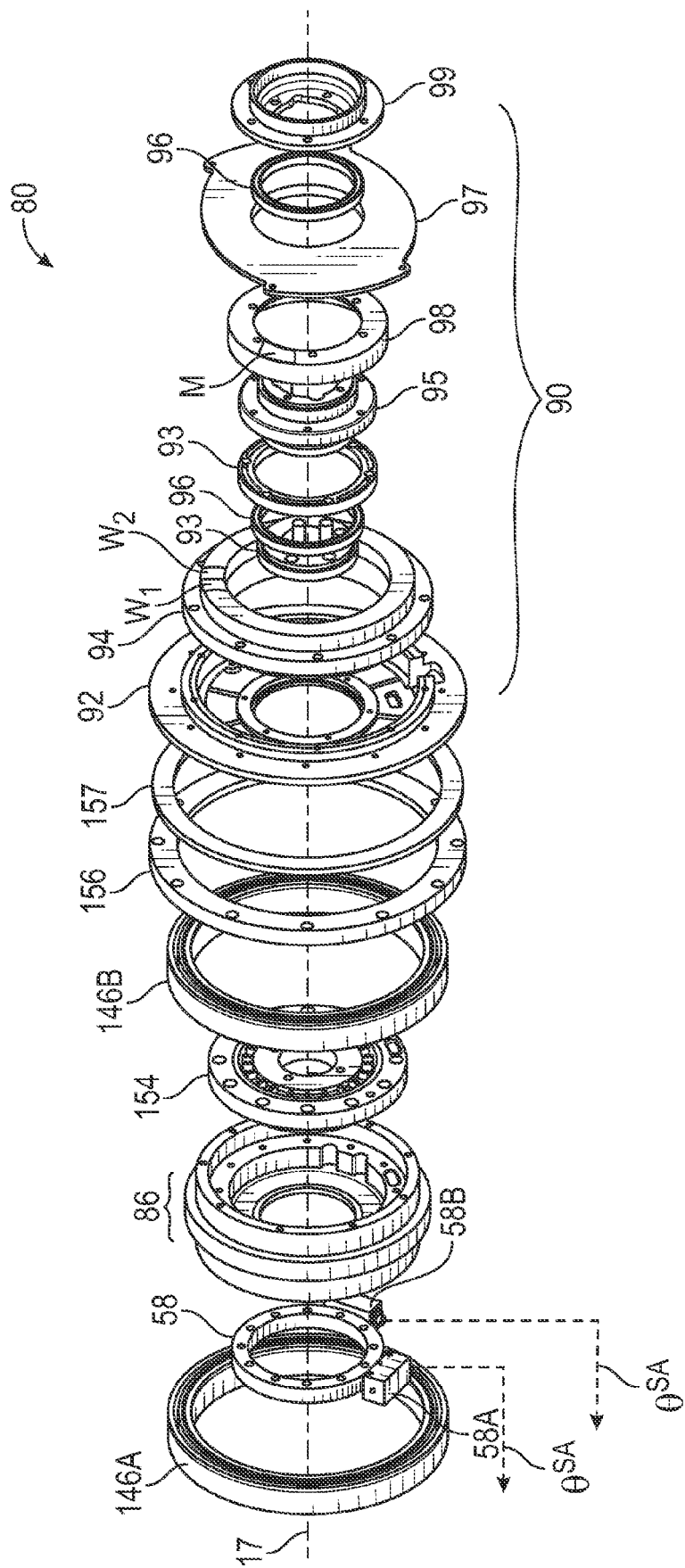
FIG. 4 is a schematic exploded perspective front view illustration of the eModule of FIG. 3.

Referring to FIG. 4, each eModule 40 includes a steering control assembly 80. Each steering control assembly 80 includes a series of annular components arranged along a steering axis 17. As viewed from left to right in FIG. 4, the steering control assembly 80 includes a plurality of sequentially stacked components that include a lower support bearing 146A, an encoder read disc 58, a steering hub 86, a speed reducing gear set 154, an upper support bearing 146B, a bearing clamp 156, a seal 157, and a steering motor stack 90. The encoder read disc 58 includes a first and a second steering sensor 58A, 58B, each of which measures and outputs the steering angle (arrow $\theta_{SA}$) to a corresponding one of the steering controllers 50S1, 50S2 of FIG. 3. In one possible embodiment, the speed reducing gear set 154 shown in FIG. 4 provides a steering speed reduction ratio of at least 100:1, e.g., reducing a 2000 RPM steering input speed to a 20 RPM actual steering speed as transmitted to the drive wheel 18. This reduction in turn amplifies steering torque, as will be understood by those of ordinary skill in the art.

Still referring to FIG. 4, the upper support bearing 146B is disposed adjacent the speed reducing gear set 154, as shown. The bearing clamp 156 and seal 157 respectively maintain compression on the bearings 146A, 146B and provide a fluid seal within the steering control assembly 80, with the bearings 146A, 146B helping to support the load of the vehicle 10 of FIG. 1 at a given eModule 40.

The seal 157 shown in FIG. 4 seals against the steering motor stack 90. The steering motor stack 90 includes a motor support race 92 and a dual-wound stator 94 having two sets of windings W1 and W2, with only a portion of the windings W1 and W2 shown schematically for illustrative simplicity. The steering motor stack 90 may also include annular motor supports 93 and a pair of motor bearings 96. A motor hub 95 supports a rotor 98, on which are epoxied or otherwise secured a series of permanent magnets (M), only one of which is shown for clarity. The steering motor stack 90 is then secured together via a support plate 97 of aluminum or other suitable material and an outer race 99. Other embodiments of the various supporting elements shown in FIG. 4 may vary with the design. However, to provide functional redundancy to the steering function, the steering control assembly 80 should retain the design of the dual-wound stator 94 and the first and second steering sensors 58A, 58B.

Referring again to FIG. 4, the first and second steering sensors 58A, 58B, and other associated hardware (not shown), for a given eModule 40, can be housed with the first and second steering controllers 50S1, 50S2, and configured to properly encode the position and rotational speed of a steering joint within the eModule 40, as well as to amplify steering torque from such a steering motor. As will be appreciated by those having ordinary skill in the art, such embedded controllers may include printed circuit board assemblies (PCBAs) having local task execution responsibility for the eModule 40 within which the PCBA is embedded with instructions received from the primary master controller 50. The various PCBAs embodying the individual embedded controllers 50P, 50B, 50S1, and 50S2 may include a microprocessor, tangible, non-transitory and transitory memory, transceivers, cooling plates, and the like, and programmed to perform specific tasks locally with respect to the eModule 40 in which the PCBA is embedded.

With reference to FIG. 3, the propulsion controller 50P may be contained within the upper portion 70 of the housing 68, thereby securing the propulsion controller 50P in proximity to the drive wheel 18 being controlled without subjecting the propulsion controller 50P to the forces typically experienced by the drive wheel 18 as the vehicle 10 travels along a road surface. The brake controller 50B may be positioned in the lower portion 74. Any or all of the various controllers 50, 150, 50B, 50S1, 50S2, 50P provide a level of functional redundancy. For instance, as discussed previously, redundant steering controllers 50S1, 50S2, provide back-up steering control functionality and the secondary master controller 150 provides back-up to the primary master controller 50 for reliable control of the vehicle 10, in the event the primary master controller 50 and/or one of the steering controllers 50S1, 50S2 should experience an unexpected transient logic error or other unexpected hardware or software fault.

With continued reference to FIG. 3, the three axes of the eModule 40 are represented as the wheel axis 17, pivot axis 19, and steering axis 21. The drive wheel 18 rotates with respect to the wheel axis 17 as noted above, while the mounted eModule 40 rotates through an actual steering angle range indicated by double-headed arrow $\theta_{SA}$. The driver wheel 18 is also allowed to pivot with respect to axis 19 to help absorb shock and road vibration. Referring to FIG. 3, the wheel axis 17 and the steering axis 21 are longitudinally offset from one another in an XY plane, thus giving them a caster wheel offset, as will be explained in more detail below.

Figure 15:
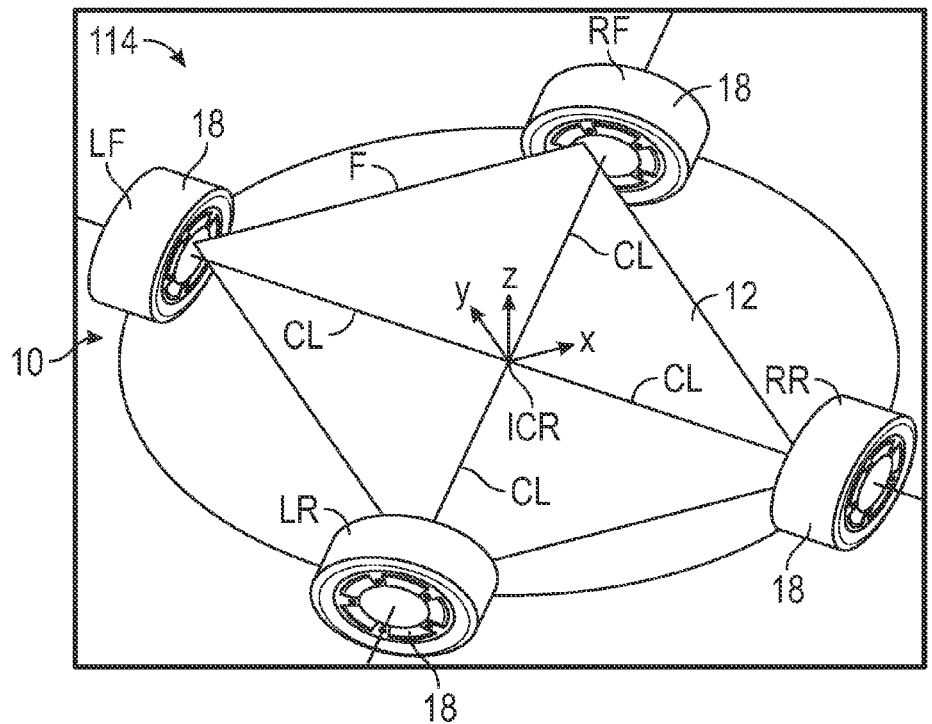
FIG. 15 is a schematic diagrammatic view of the vehicle illustrating the diamond steering mode.
Figure 16:
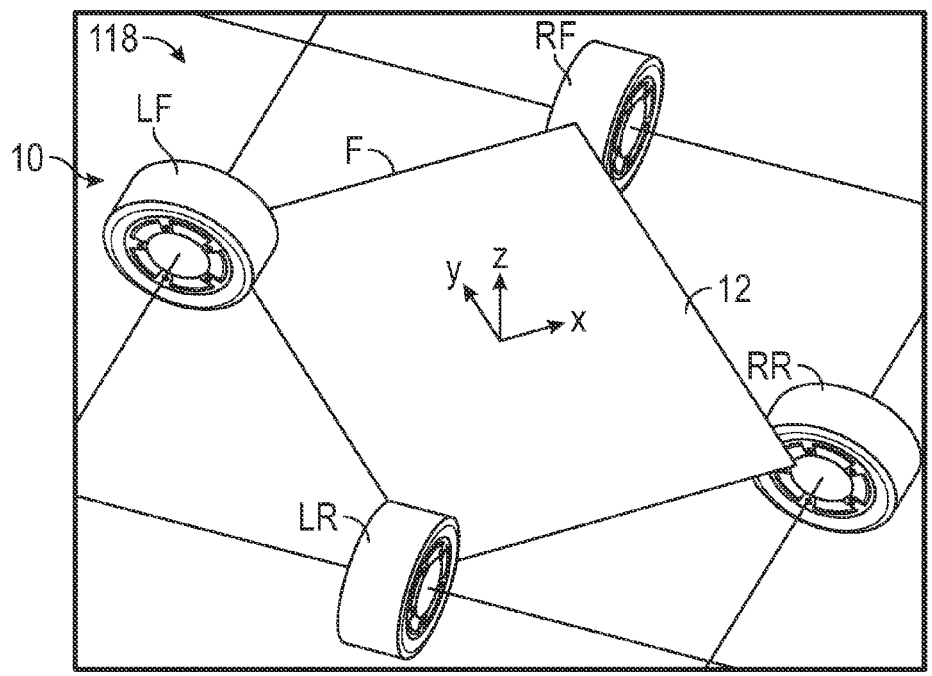
FIG. 16 is a schematic diagrammatic view of the vehicle illustrating the park mode.

Use of the modular, independently-controlled eModules 40 of FIG. 3 enables different steering or drive modes, including two-wheel steer (2WS) 110, four-wheel steer (4WS) 112, diamond steer 114, and omni-directional steering 116 modes, as well as a park mode 118. The 2WS mode 110 and 4WS mode 112 enable steering via two or four of the eModules 40, respectively. Diamond steering is a particular 4WS mode in which the drive wheels 18 are positioned such that a center line CL passing through their respective centers, which all pass through a center point C of the vehicle 10. As illustrated in FIG. 15, propulsion in this diamond steer mode 114 would cause the vehicle 10 to rotate in place around its vertical axis, as will be appreciated by one having ordinary skill in the art.

Figure 12:
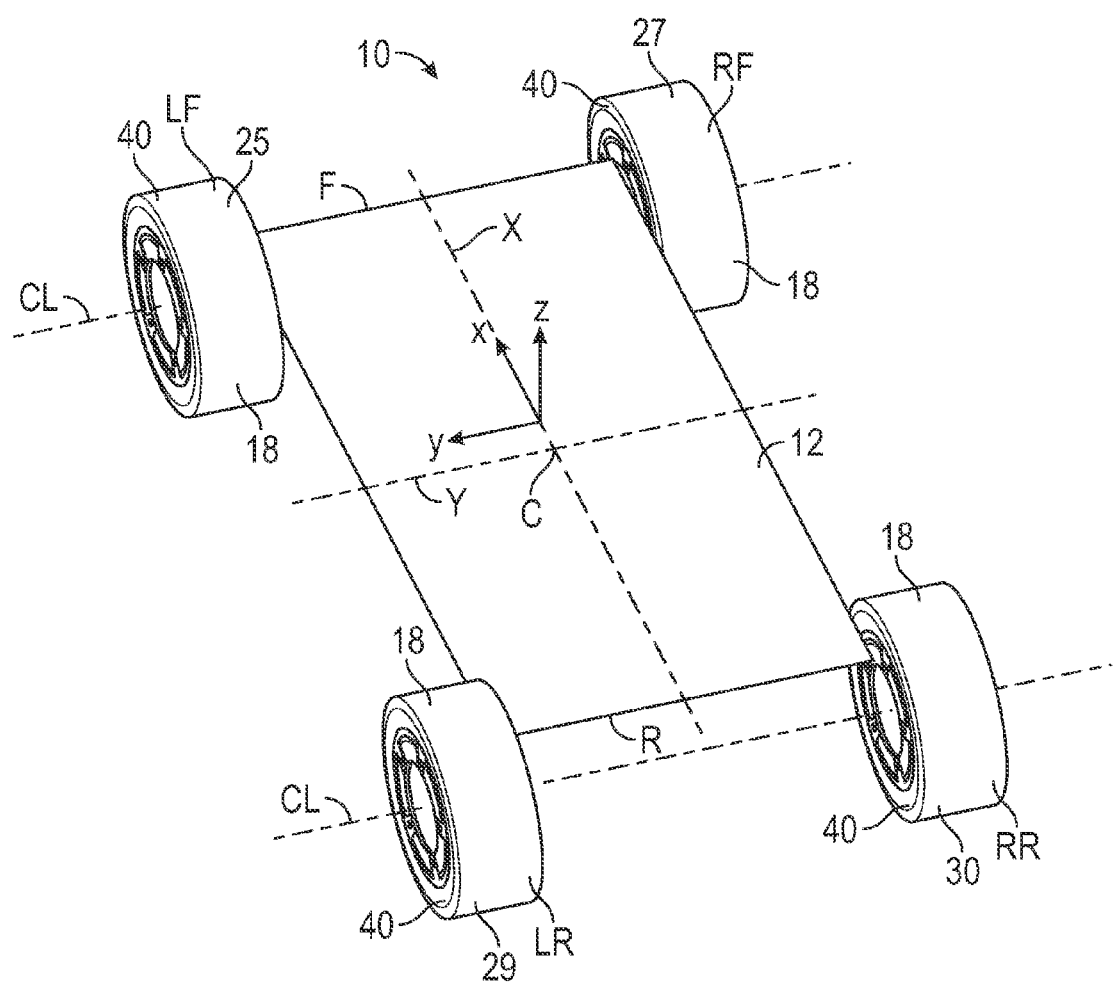
FIG. 12 is a schematic diagrammatic view of the vehicle.
Figure 17B:
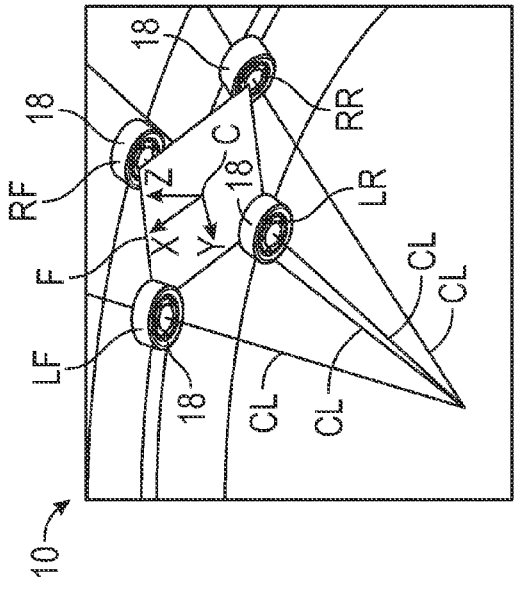
FIGS. 17A-17C are schematic diagrammatic views of the vehicle illustrating an omni-directional steering mode.
Figure 17A:
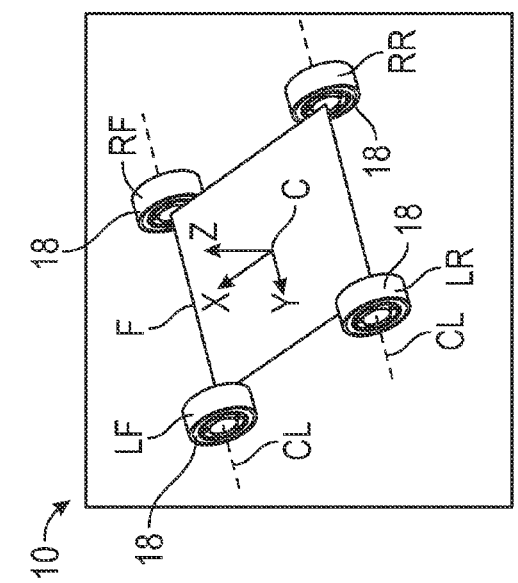
Figure 17C:
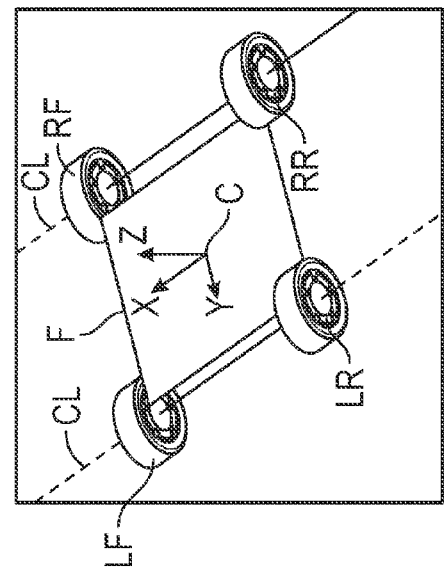

Referring to FIG. 17A, omni-directional steering 116 places all of the drive wheels 18 at the same angle with respect to the vehicle's 10 longitudinal axis, i.e., the lengthwise or X axis of the vehicle 10 as shown in FIG. 12, such that the drive wheels 18 are all facing in the same direction. This enables a "crab mode" driving maneuver wherein the vehicle 10 can transition into movement at an angle with respect to its longitudinal axis, as illustrated in FIG. 17B, including at right angles, as illustrated in FIG. 17C. Such a mode might facilitate difficult parking maneuvers, particularly parallel parking into a tight parking space. While the 2WS mode 110, the 4WS mode 112, and the diamond steer mode 114 may use only one HMI sensor input for steering, i.e., the hand wheel 32, the omni-directional steering 116 uses two HMI inputs, e.g., the hand wheel 32 and the joystick 132. The hand wheel 32 is used to set the wheel directional vector by keeping all wheels 18 in-phase and the joystick 132 provides a yaw input about the Z-axis for turning left or right along the directional vector. Therefore, when the vehicle 10 is translating at an angle of its longitudinal axis, the joystick 132 allows the vehicle 10 to turn left or right. A unique maneuver can be done in when the omni-directional steering 116 mode when the hand wheel 32 and the joystick 132 inputs are both used, but in opposite directions from one another. As such, the vehicle 10 drives in one direction, e.g., down a lane of a road while the wheel angles to the ground stay the same, but the relative motion of the eModules 40 are pushed back into the vehicle and the vehicle body 14 yaws about the XY center point of the vehicle 10.

Park mode 118 means that angles of the LF, RF, LR, and RR wheels 18 relative to a front F of the vehicle 10 such the RF and LR wheels 18 are at the same angle and the LF and RR wheels 18 are at the same angle. Thus, in park mode 118 the LF and RF wheels 18 and the LR and RR wheels 18 would point outward with respect to the X axis of the vehicle 10, thereby causing wheel scrub and preventing vehicular motion in any direction without the use of wheel brakes.

As noted above, the primary and secondary master controllers 50, 150 are programmed to execute a wide spectrum of different steering modes, including the two-wheel, four-wheel, diamond, and omni-directional or "crab" steering noted above. The modular design of the eModules 40, along with the distributed control network with the primary and secondary master controllers 50, 150 at its center, enables such flexibility. A driver, using the HMI screen 38 of FIG. 2 or other suitable input device such as a mode selector switch, can pick the steering maneuver for a given drive situation. FIG. 5 illustrates the ability of the vehicle 10 to transition between the steering modes when the vehicle 10 is stopped, i.e., in the park mode 118. As indicated, the vehicle 10 may switch from the park directly into any of the other modes, i.e., 2WS 110, 4WS 112, diamond steering 114, and omni-directional steering 116. Likewise, FIG. 6 illustrates the ability of the vehicle 10 to transition between the steering modes when the vehicle 10 is in motion. As indicated, the vehicle 10 may transition from 2WS to and from 4WS 112, from 4WS 112 to the omni-directional steering 116 and from the omni-directional steering 116 to 2WS 110.

It should be appreciated that only the 2WS 110, 4WS 112, or omni-directional steering 116 modes may also be changed while the vehicle 10 is stationary or when the vehicle 10 is in motion. More specifically, a joystick 132 position is selected by the driver for a particular steering mode and then a button 133 on the joystick 132 is pressed to activate the selected mode. However, changing steer modes requires several conditions to be valid. First, the wheel angles must be near zero degrees, e.g., driving forward. Second, the vehicle velocity must be below a maximum velocity of the selected steering mode. By way of a non-limiting example, the 2WS mode 110 may have a maximum velocity of 40 mph and the omni-directional steering 116 mode may be 15 mph. Therefore, in order to switch from the 2WS mode 110 to the Omni-directional steering 116 mode, the vehicle 10 must be less than or equal to 15 mph. Third, the joystick 132 Z-axis (Yaw) must be near zero. Since the omni-directional steering mode 116 uses the Z-axis to turn, the angle must be near zero so as to prevent sudden turns when the vehicle 10 transitions into the omni-directional steering 116 mode.

The ability of the vehicle 10 to change steering modes while the vehicle 10 is in motion allows for quick changes without distracting the driver from the field of view, e.g., the roadway. Conversely, the system may be configured such that the HDMI menu 38 may only be activated when the vehicle 10 is stopped. Although a menu system may be used when the vehicle 10 is in motion, it may be configured to only show valid modes for selection when the vehicle 10 is in motion.

Referring to FIGS. 5 and 7, a method of controlling steering of the vehicle 10 from the park position involves setting wheel angles of each of the eModules, relative to the chassis is shown at 200. A command is received by the master controller at step 210 to activate a mode selection menu. With reference to FIG. 5, some of the available mode selections on the mode selection menu may include two wheel steer 110, four wheel steer 112, omni-directional or crab ("omni") steer mode 116, diamond steer mode 114, park, and the like.

Referring again to FIGS. 2 and 7, the master controllers 50, 150 determine at step 220 if the vehicle 10 is in motion. The driver mode selection menu is then activated at step 230 when the vehicle 10 is determined to not be in motion. Likewise, the drive mode selection menu is not activated when the vehicle 10 is, determined to be in motion. As such, the selection is cancelled at step 240.

At step 250, the master controllers 50, 150 receive a selected first driving mode, selected from the mode selection menu. The master controllers 50, 150 then determine at step 260 when the brake pedal 34 is activated. A first drive mode request, corresponding to the selected first driving mode, is transmitted at step 270 to a plurality of steering controllers 50S1, 50S2 when the brake pedal 34 is determined to be activated. Each of the steering controllers 50S1, 50S2 corresponds to a respective eModule 40.

Once the first drive mode request is transmitted, the method proceeds to initiating a steering algorithm 400, 500, 600, 700, corresponding to the selected first drive mode request at 280. The required steering algorithm 400, 500, 600, 700 may correspond to the 2WS mode 110, 4WS mode 112, diamond steering mode 114, omni-directional steer mode 116, and park mode 118, which are all executed by the master controller at step 280. Generally, the steering algorithm 400, 500, 600, 700 determines the required steering angle of each of the plurality of eModules 40 as a function of a determined position of the steering input device 32, the determined velocity of the vehicle 10, and the selected first driving mode.

When the vehicle 10 is already operating in a driving mode and in motion, the master controllers 50, 150 may receive a request for a second driving mode, also selected from the mode selection menu, at step 300. This second driving mode is different from the first driving mode and, as described in more detail below, may only be entered from the first driving mode when certain requirements are met.

The position of the steering input device 32 is determined at step 310. The position of the steering input device 32 may be an angle of the steering wheel, relative to a front F center of the vehicle 10. A determination is made, in the master controllers 50, 150 at step 320, as to whether the position of the steering input device 32 is near center. If the position of the steering input device 32 is not near center, then the selection is aborted and the method proceeds to step 240. The position of the steering input device 32 is only used if the vehicle 10 is in motion. If the vehicle 10 is stopped, the steering input device 32 may be in any position when selecting the driving mode.

If the position of the steering input device 32 is near center, then the method proceeds to step 330. At step 330, a determination of the vehicle speed is made, in the master controller. If the vehicle speed is greater than a maximum velocity, then the selection is aborted and the method proceeds to step 240. If the vehicle speed is determined to be no greater than the maximum velocity, then the method proceeds to step 350, where a second drive mode request is sent to the steering controller 50S1, 50S2.

The master controllers 50, 150 then determine at step 310, the position of the steering input device 32. The master controllers then determine a velocity of the vehicle 10 when the determined position of the steering input device 32 is near center.

A second drive mode request corresponding to the selected second driving mode is transmitted at step 320 to the plurality of steering controllers 50S1, 50S2 when the velocity of the vehicle 10 is determined to be no greater than a maximum velocity.

A steering algorithm is executed by the master controllers 50, 150 at step 280. Generally, the steering algorithm determines the required steering angle of each of the plurality of eModules 40 as a function of the determined position of the steering input device 32, the determined velocity of the vehicle 10, and the selected first driving mode. It should be appreciated that the determined steering angles may be updated at any desired frequency. By way of a non-limiting example, the determined steering angles may be updated at 100 Hertz (Hz). After the required steering angles are determined, each of the eModules is set to the respective determined steering angles at step 280.

Figure 8:
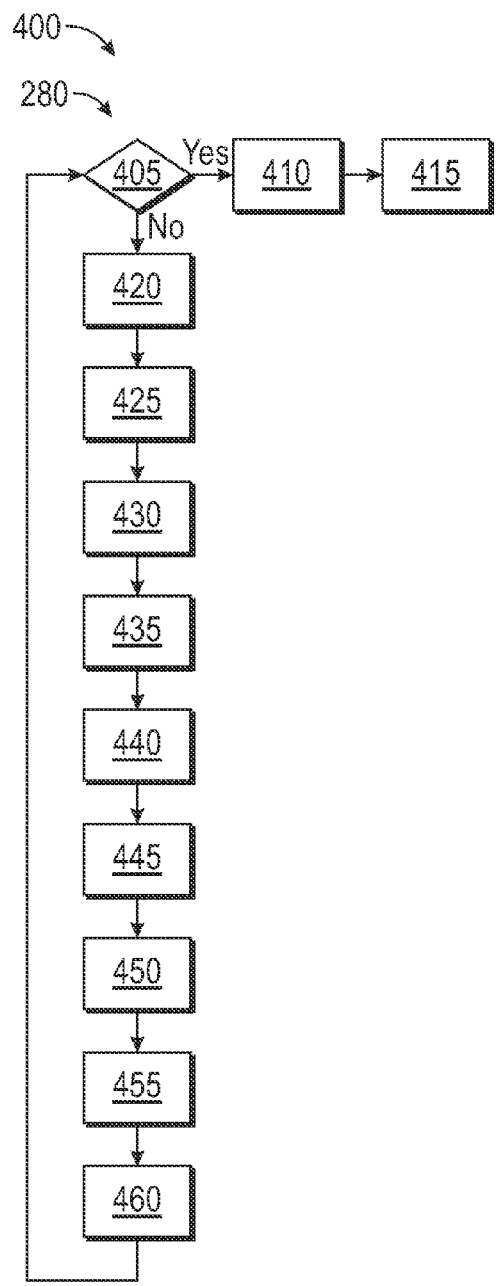
FIG. 8 is an example flow chart for a steering algorithm for initiating a two-wheel steering (2WS) mode at step 280 in FIG. 7.

Referring to FIGS. 8 and 12, when the selected driving mode is 2WS 110, a 2WS steering algorithm 400 is executed at 280. In the 2WS algorithm 400, a determination is made as to whether the position of the setting input device is near 0 degrees at step 405. If the determined position of the steering input device 32 is near 0 degrees, i.e., near center, each of the eModules is set to an angle of 0 degrees at step 410. The angle setting of each of the eModules is recorded in a memory in the master controllers 50, 150 at 415. When the determined position of the steering input device 32 is not near 0 degrees, then a required steering angle is calculated in the master controllers 50, 150 at step 420.

Next, an instantaneous center of rotation (ICR) is set to be along a centerline of the LR and RR wheels, i.e., along a Y axis of the vehicle 10 at step 425. Then, the angle setting of the LR and RR wheels is set to 0 degrees at step 430. A coordinate position of the ICR in an XY coordinate plane is then calculated as a function of the calculated steering angle at step 435. The steering angles of each of the LF and RF wheels are next calculated to intersect with the calculated ICR at step 440.

Figure 13:
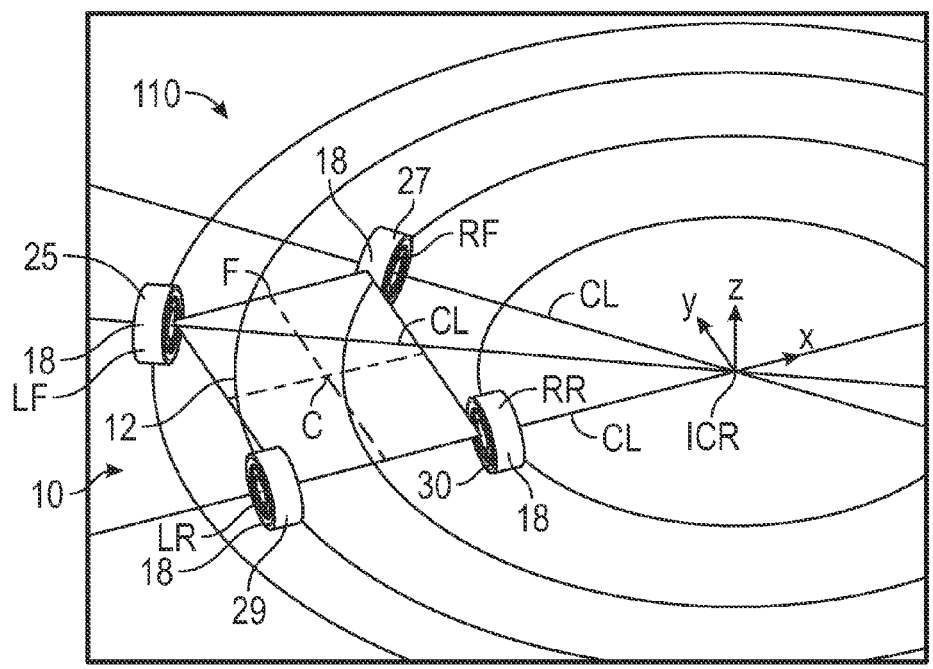
FIG. 13 is a schematic diagrammatic view of the vehicle illustrating the 2WS mode.

If the LF and RF wheels have a steering axis and a wheel axis that are offset, i.e., caster wheel offset, then the caster wheel offsets for each of the LF and RF wheels is calculated at step 445. Then, the wheel angle offsets are calculated to align the LF and RF wheel centers with the calculated ICR at step 450, as illustrated in FIG. 13.

Next, the wheel angles of the LF and RF wheels are calculated, relative to the front F of the vehicle 10 at step 455. Then, the calculated wheel angles are written to the main memory of the master controllers 50, 150 at 460.

Figure 9:
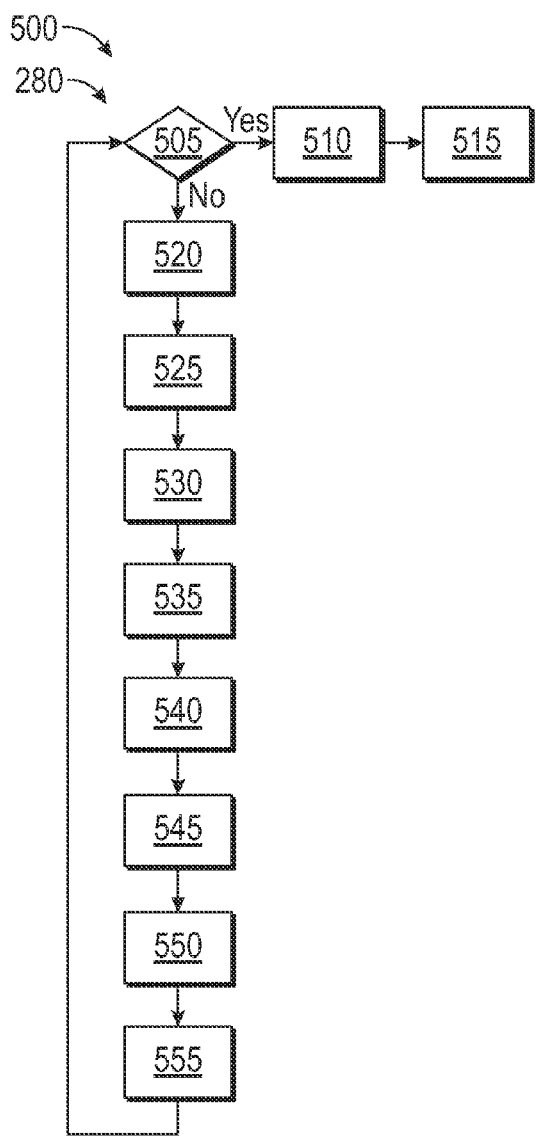
FIG. 9 is an example flow chart for a steering algorithm for initiating a four-wheel steering (4WS) mode at step 280 in FIG. 7.
Figure 14:
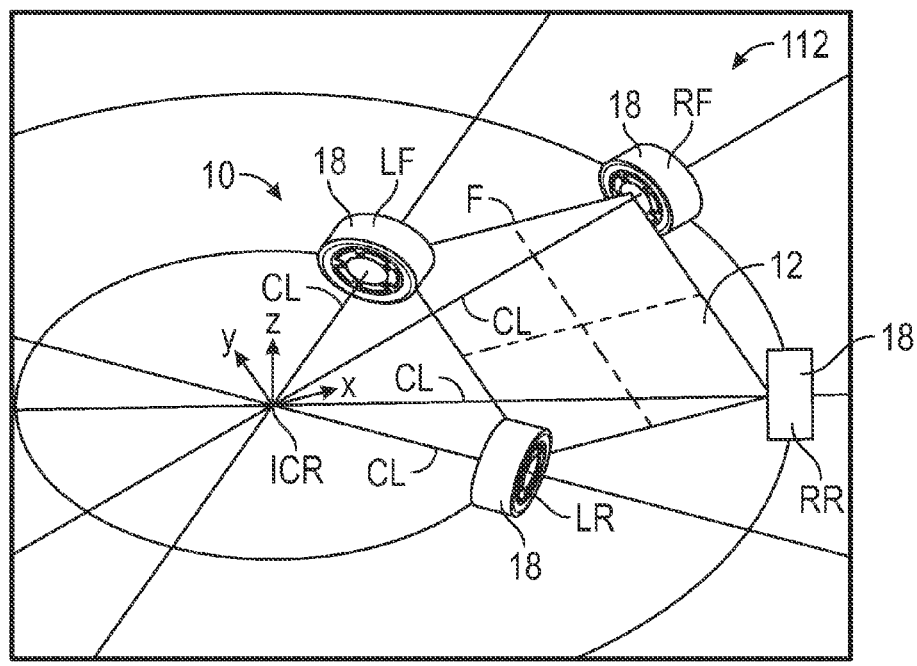
FIG. 14 is a schematic diagrammatic view of the vehicle illustrating the 4WS mode.

Referring to FIGS. 9, 12, and 14, when the selected driving mode is 4WS 112, a 4WS steering algorithm 500 is executed at 280. In the 4WS algorithm 500, a determination is made as to whether the position of the setting input device is near 0 degrees at step 505. If the determined position of the steering input device 32 is near 0 degrees, i.e., near center, each of the eModules is set to an angle of 0 degrees at step 510. The angle setting of each of the eModules is recorded in a memory in the master controllers 50, 150 at 515.

When the determined position of the steering input device 32 is not near 0 degrees, an ICR lateral line offset is calculated as a function of the velocity of the vehicle 10 at step 520. When the velocity of the vehicle 10 is no less than a minimum velocity, the ICR lateral line is calculated to intersect a center of the vehicle 10. When the velocity of the vehicle 10 is greater than a maximum velocity, the ICR lateral line is set to intersect the center of the LR and RR wheels. When the velocity of the vehicle 10 is greater than the minimum velocity and no greater than the maximum velocity, then the ICR lateral line is set to transition linearly from the position corresponding to velocity that is no less than the minimum velocity and the velocity that is greater than the maximum velocity. By way of a non-limiting example, the minimum velocity may be 5 miles per hour (mph) and the maximum velocity may be 10 mph.

At step 525, the steering angle is calculated as a function of the steering input device 32 angle and a max steer angle. The max steer angle is dependent on the steering case of the vehicle 10, i.e., 2WS 110, 4WS 112. When 2WS 110 is selected, the max steer angle is at a first angle and when 4WS is selected, the max steer angle is at a second angle, different from the first angle. Therefore, during transition, the max steer angle varies linearly with velocity of the vehicle 10 between the value of the first angle and the value of the second angle.

Next, at step 530, a coordinate position of the ICR in an XY coordinate plane is then calculated as a function of the calculated steering angle. The steering angles of each of the LF and RF wheels are next calculated to intersect with the calculated ICR at step 540. In turn, the wheel angle of each of the LR, RR, LF, and RF wheel is calculated to intersect with the calculated ICR at step 535, as illustrated in FIGS. 14 and 15.

If the LR, RR, LF, and RF wheels have a steering axis and a wheel axis that are offset, i.e., caster wheel offset, then the caster wheel offsets for each of the LR, RR, LF, and RF wheels are calculated at step 540. Then, the wheel angle offsets are calculated to align the LR, RR, LF, and RF wheel centers with the calculated ICR at step 545.

Next, the wheel angles of the LR, RR, LF, and RF wheels are calculated, relative to the front F of the vehicle 10 at step 550. Then, the calculated wheel angles are written to the main memory of the master controllers 50, 150 at step 555.

As described previously, other modes, such as the diamond steer mode 114 illustrated in FIG. 15, may be a subset of the 4WS mode 112. Therefore, when the diamond steer mode 114 is selected, the ICR becomes the center C of the vehicle 10 and each of the LR, RR, LF, and RF wheels 18 are angled, relative to the front F of the vehicle 10 such that the wheel 10 centerlines CL pass through the center C of the vehicle 10. The wheel angles remain constant during the diamond steer mode 114 and are dependent of the aspect ratio of the vehicle 10, i.e. length and width of the vehicle. The LF and RR wheels 10 may be rotated about the Z-axis in the negative direction, while the RF and LR wheels are rotated about the Z-axis in the positive direction. Rotation of the vehicle 10 about the ICR may be controlled by applying a correct propulsion motor direction for each of the LR, RR, LF, and RF wheels 18. The velocity of the vehicle 10 in the diamond steer mode 114 may be limited to a maximum velocity. By way of a non-limiting example the velocity may be limited to 2 mph.

Further, vehicle motion in the diamond steer mode 114 from another mode may only be achieved if a minimum threshold of the steering angle of the steering input device 32 is exceeded and a defined amount of displacement of the accelerator pedal 36, i.e., throttle, is not exceeded. By way of a non-limiting example, of the steering input device 32 is turned to the minimum threshold of 45 degrees, in either direction, and the defined amount of displacement of the accelerator pedal 36 is exceeded.

In another non-limiting example, the diamond steer mode 114 may be achieved when the defined amount of displacement of the accelerator pedal 34 is achieved and the steering input device 32 is turned slowly in the desired direction of displacement. As such, if the steering input device 32 is at center, i.e., 0 degrees, the vehicle will stop. However, if the steering input device 32 is at the minimum threshold of 45 degrees, the vehicle will turn in the direction of the steering input device 32, i.e., left or right.

In yet another non-limiting example, the diamond steer mode 114 may be achieved by using a combination of varying the angle of the steering input device 32 and the amount of displacement of the accelerator pedal 34.

Figure 18A:
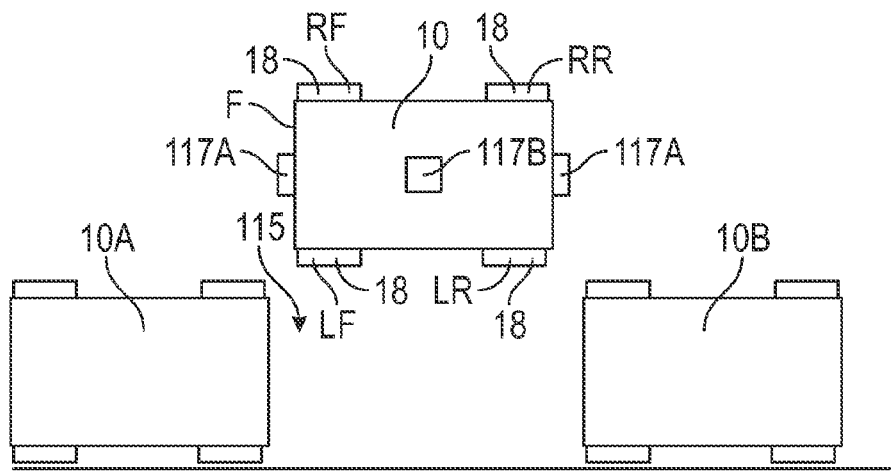
FIGS. 18A-18F are schematic diagrammatic views of the vehicle illustrating a parking maneuver between two other vehicles.
Figure 18B:
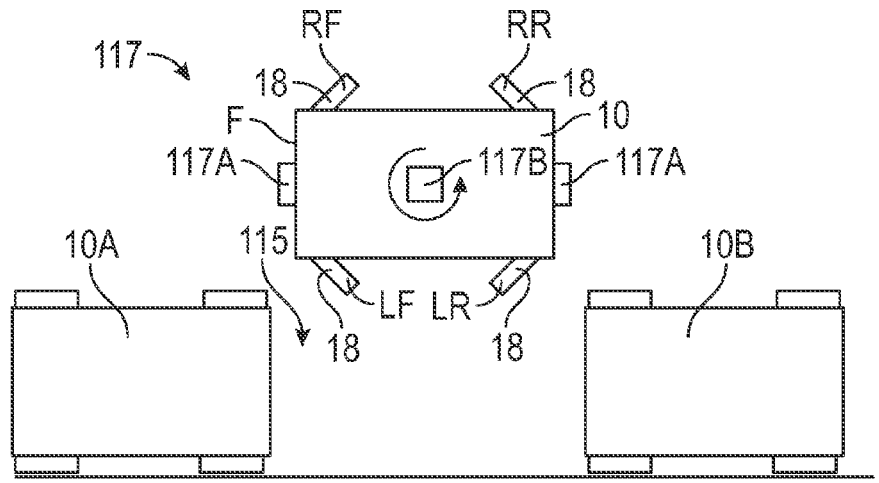
Figure 18C:
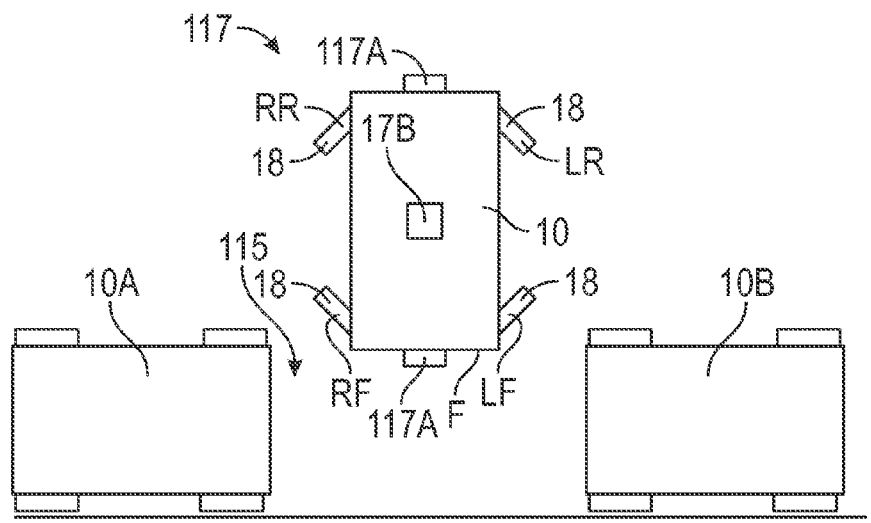
Figure 18D:
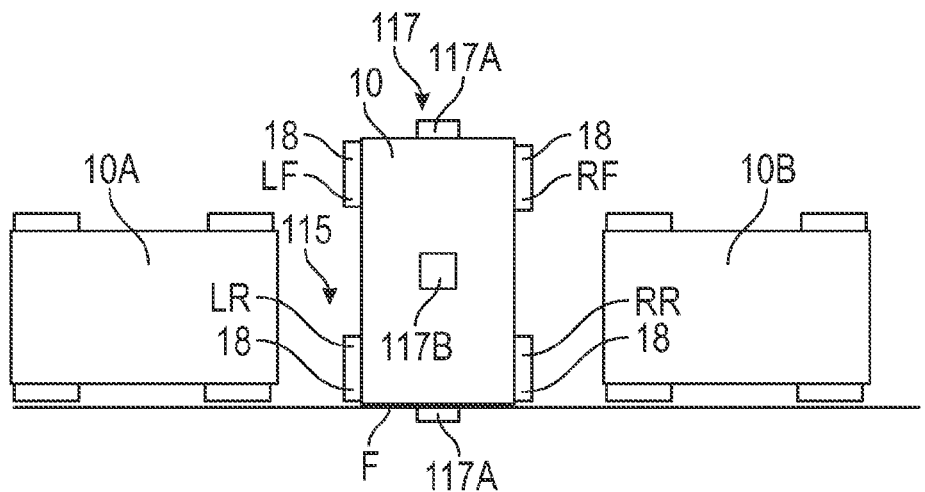
Figure 18E:
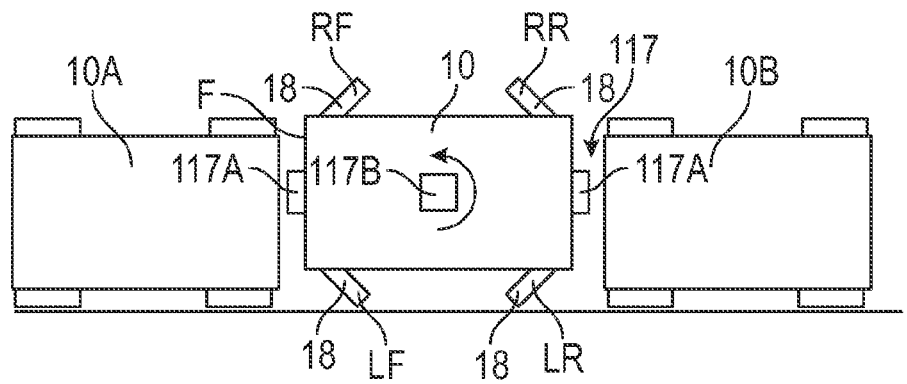
Figure 18F:
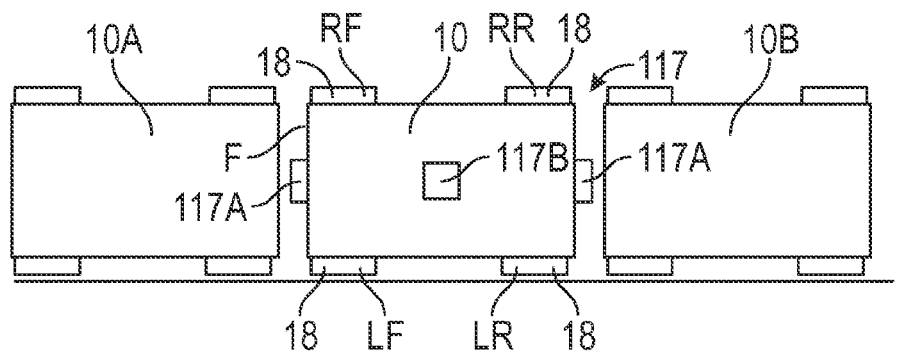

Referring to FIGS. 18A-18F, the diamond steer mode 114 may be used to position the vehicle in a spot 115 located between two objects, such as between two other vehicles 10A, 10B when parallel parking. By way of a non-limiting example, the vehicle 10 may include location devices 117, such as at least one proximity sensor 117A, a camera 117B, and the like. The location devices 117 may be configured to determine proximity of portions of the vehicle 10 relative to the other vehicles 10A, 10B. The vehicle 10 is positioned adjacent the spot 115, as illustrated in FIG. 18A. The operator of the vehicle 10 may select a parallel parking maneuver and the like from the HMI selection menu 38. Once selected, the location devices 117 may determine the position of the portions of the vehicle 10, relative to the other vehicles 10A, 10B. Once determined, the LR, RR, LF, and RF wheels 18 are angled, relative to the front F of the vehicle 10 such that the wheel 10 centerlines CL pass through the center C of the vehicle 10, as illustrated in FIG. 18B. Propulsion of the LR, RR, LF, and RF wheels 18 is then initiated until the vehicle 10 rotates to a desired position such that the front F of the vehicle 10 faces the spot 115, as illustrated in FIG. 18C. Once positioned, the LR, RR, LF, and RF wheels 18 are rotated until the LR, RR, LF, and RF wheels 18 are facing forward F, as illustrated in FIG. 18D. Next, propulsion of the LR, RR, LF, and RF wheels 18 is initiated until the vehicle 10 is located in the spot 115 between the two vehicles 10A, 10B. Additionally, referring to FIGS. 18E and 18F, if typical parallel parking in the spot 115 between the two vehicles 10A, 10B is desired, then when the vehicle 10 is positioned in the spot 115 between the vehicles 10A, 10B, another diamond steer mode 114 may be initiated to turn the vehicle 10 until the front F of the vehicle 10 is facing one of the adjacent vehicles 10A, 10B.

Figure 19A:
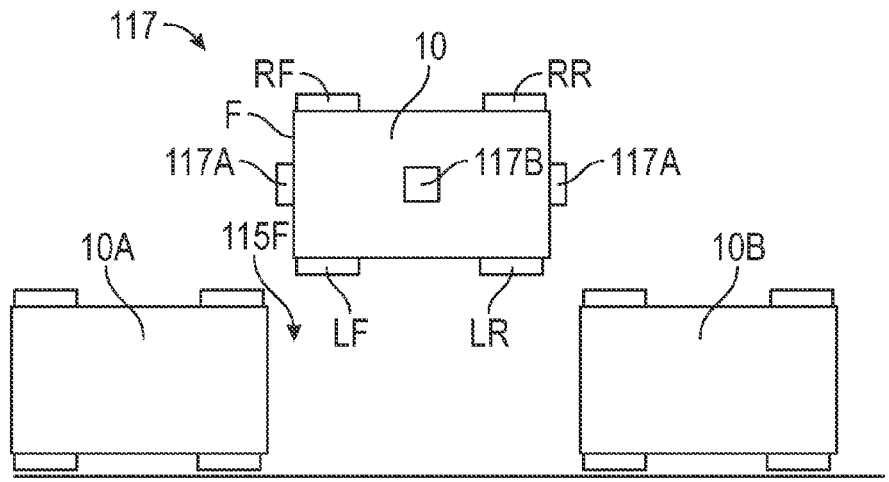
FIGS. 19A-19C are schematic diagrammatic views of the vehicle illustrating another parking maneuver between two other vehicles.
Figure 19B:
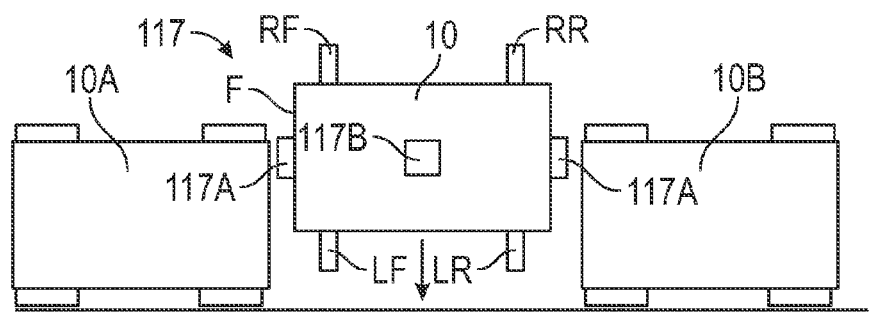
Figure 19C:
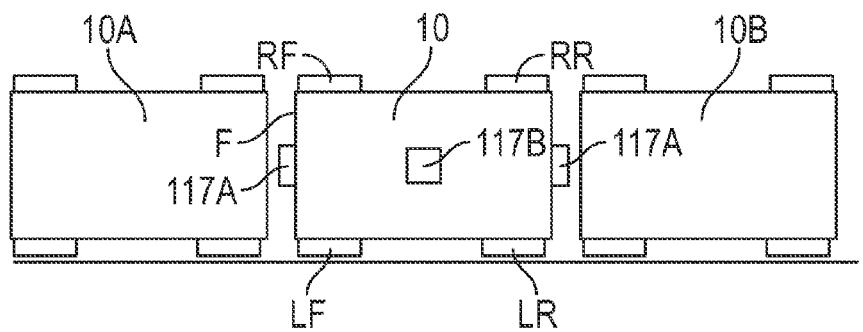

Alternatively, referring to FIGS. 19A-19C, if parallel parking is desired, once the vehicle 10 is positioned adjacent the spot 115, as shown in FIG. 19A, instead of initiating a diamond steering mode 114, the LR, RR, LF, and RF wheels 18 may be angled approximately 90 degrees from facing forward F, i.e., facing the spot. Once the wheels 18 are in this position, the vehicle 10 may be driven "sideways" toward the spot, as shown in FIG. 19B, until the vehicle 10 is disposed in the spot between the two vehicles 10A, 10B. Once in position between the two vehicles 18A, 18B, the wheels 18 may be rotated to facing forward F, as illustrated in 19C.

Another parallel parking maneuver of the vehicle 10 is illustrated in FIGS. 20A and 20B. FIG. 20A illustrates maneuvering the vehicle 10 from the initial driving position A, through the iterative driving positions B, C, D, E, until the vehicle 10 is facing in an X direction, opposite the initial driving position A and the wheels turned perpendicular to the X direction, i.e., in the Y direction. Once the vehicle 10 is in the driving position E, with the vehicle 10 positioned between the two other vehicles 10A, 10B, the vehicle 10 driven along the Y direction and the wheels may be once again turned to extend in the X direction, as illustrated in FIG. 20B. This type of parallel parking maneuver allows parallel parking without tire scrub by rotating the vehicle an entire 180 degrees during the maneuver. Using the sensors 117A, 117B, this maneuver may be executed autonomously.

With reference to FIGS. 6 and 12, when the vehicle is operating in 2WS 110 and the selection of 4WS 112 is made, the transition from 2WS 110 to 4WS 112 is a function of the velocity of the vehicle 10. When the vehicle is operating at a vehicle speed that is greater than the maximum velocity, the vehicle 10 remains in the 2WS mode 110 and configuration. When the vehicle is operating at a vehicle speed which is no greater than the maximum velocity and greater than the minimum velocity, then the transition from 2WS 110 to 4WS 112 is done by linearly moving the ICR line between the centerline CL of the LR and RR wheels 18 and the center C of the vehicle 10. If the ICR is inside of the vehicle 10, the ICR is also pulled out of the vehicle 10 linearly during this transition. When the vehicle 10 is operating at a vehicle speed that is less than the minimum velocity, then the vehicle 10 transitions to the 4WS mode 110.

Figure 10:
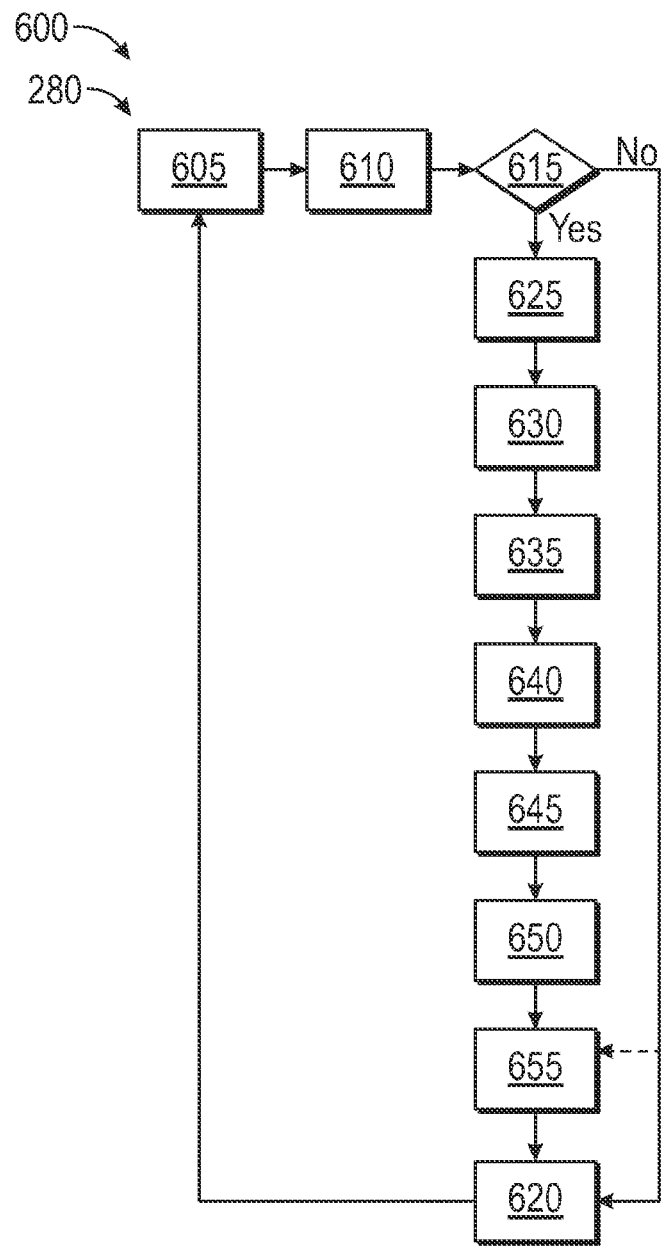
FIG. 10 is an example flow chart for a steering algorithm for initiating an omni-directional steering mode at step 280 in FIG. 7

Referring to FIGS. 10 and 12, when the selected driving mode is omni-directional steer, an omni-directional steer algorithm 600 is executed at 280. In the omni steer algorithm 600, a directional vector is calculated in the master controllers 50, 150, at step 605, as a function of the determined position of the steering input device 32. The directional vector may be a function of the angle of the steering input device 32 and a maximum omni angle. The maximum omni-directional angle limits a direction of the vector angle due to limits of the steering motor.

At step 610, a normalized joystick 132 yaw angle is determined. The angle may be within a range of 0+/−1 degrees. At step 615, if the joystick 132 yaw angle is not determined to be less than a minimum yaw angle or greater than a maximum yaw angle, then the wheel angles of the vehicle 10 are written to the main memory in the master controllers 50, 150 at step 620. However, if the joystick 132 yaw angle is determined to be less than a minimum yaw angle or greater than a maximum yaw angle, the algorithm 600 proceeds to step 625. At step 625, the steer angle is calculated as a function of the max steer angle and the joystick 132 yaw angle about the Z-axis. The max steer angle limits the turning radius of the vehicle 10 such that the combined maximum direction vector angle and maximum steering angle of any wheel does not exceed the limits of the steering motor, e.g., +/−160 degrees.

Next, the steering radius of the vehicle 10 is calculated from the center C of the vehicle 10 at step 630. The coordinate position of the ICR is calculated as a function of the calculated steering radius and the directional vector at step 635. Then, the angles of the LF eModule, the RF eModule, the LR eModule, and the RR eModule are calculated at step 640, relative to the location of the steering motor.

If the LR, RR, LF, and RF wheels have a steering axis and a wheel axis that are offset, i.e., caster wheel offset, then the caster wheel offsets for each of the LR, RR, LF, and RF wheels are calculated at step 645. Then, the wheel angle offsets are calculated to align the LR, RR, LF, and RF wheel centers with the calculated ICR at step 650.

Next, the wheel angles of the LR, RR, LF, and RF wheels are calculated, relative to the front F of the vehicle 10 at step 655. At step 620, the wheel angle of the LF eModule, the RF eModule, the LR eModule, and the RR eModule are recorded to the memory in the master controllers 50, 150.

Figure 11:
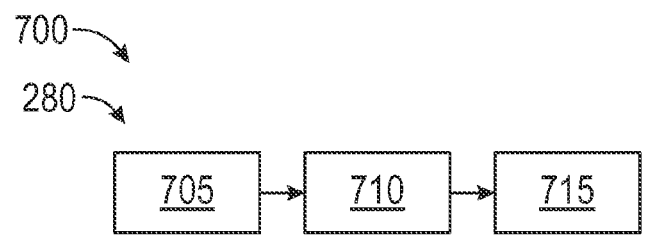
FIG. 11 is an example flow chart for a steering algorithm for initiating a park mode at 280 in FIG. 7.

Referring to FIGS. 11 and 12, when the selected driving mode is the park mode 118, a park mode algorithm 700 is executed at 280. In the park mode algorithm 700, a determination is made in the master controllers 50, 150, whether the vehicle 10 is in motion at step 705. At step 710, the wheel angles of the LR 29, RR 30, LF 25, and RR 27 wheels 18 are determined. In the park mode 118, the wheel angles of the LR 29, RR 30, LF 25, and RR 27 wheels 18 may be pre-programmed in the memory in the master controllers 50, 150. The wheel angle of the LR 29, RR 30, LF 25, and RR 27 wheels 18 may be such that each LR 29, RR 30, LF 25, and RR 27 wheel 18 is set to a constant angle, relative to the front F of the vehicle 10, so as to oppose the vehicle 10 rolling in any direction by creating wheel scrub. At step 715, the wheel angle of the LF 25 eModule 40, the RF 27 eModule 40, the LR 29 eModule 40, and the RR 30 eModule 40 are recorded to the memory in the master controllers 50, 150.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A method of controlling steering of a vehicle through setting wheel angles of a plurality of modular electronic corner assemblies (eModules), the method comprising:
   receiving a driving mode selected from a mode selection menu;
   determining, in a master controller, a position of a steering input device;
   determining, in the master controller, a velocity of the vehicle when the determined position of the steering input device is near center;
   transmitting a drive mode request corresponding to the driving mode to a plurality of steering controllers when the steering wheel is near center and the velocity of the vehicle is below a maximum velocity;
   determining, in the master controller, a required steering angle of each of the plurality of eModules as a function of the determined position of the steering input device, the determined velocity of the vehicle, and the driving mode; setting each of the eModules to an angle of 0 degrees and recording the angle setting of each of the eModules to a memory in the master controller, when the determined position of the steering input device is near 0 degrees; and
   setting the eModules to the respective determined steering angles.

2. A method, as set forth in claim 1, wherein the plurality of eModules are a left front (LF) eModule, a right front (RF) eModule, a left rear (LR) eModule, and a right rear (RR) eModule.

3. A method, as set forth in claim 2, wherein determining, in the master controller, a required steering angle is further defined as:
   calculating a steering angle when the determined position of the steering input device is not near 0 degrees;
   setting an instantaneous center of rotation (ICR) to be along a centerline of rear wheels of the LR eModule and the RR eModule;
   setting each of the LR and RR eModules to an angle;
   calculating a coordinate position of the ICR as a function of the calculated steering angle;
   calculating angles of the LF eModule and RF eModule;
   calculating a wheel angle of the LF eModule and the RF eModule; and
   recording the wheel angle of the LF eModule and the RF eModule to the memory in the master controller.

4. A method, as set forth in claim 3, wherein setting each of the LR and RR eModules to an angle is further defined as setting each of the LR and RR eModules to an angle of 0 degrees when the drive mode request is a two-wheel steer (2WS) drive mode request.

5. A method, as set forth in claim 3, further comprising:
calculating a caster wheel offset for the LF eModule and the RF eModule; and
calculating wheel angle offsets for the LF eModule and the RF eModule to align a center of each of the respective wheels to the ICR;
wherein calculating a wheel angle of the LF eModule and the RF eModule is further defined as calculating a wheel angle of the LF eModule and the RF eModule as a function of the alignment of the center of each of the respective wheels to the ICR.

6. A method, as set forth in claim 3, wherein receiving a driving mode selected from the mode selection menu is further defined as receiving a four wheel steer (4WS) drive mode request from the mode selection menu when the vehicle is operating in a 2WS drive mode; and
wherein setting the LR and RR eModules to an angle is further defined as:
setting the LR and RR eModules to an angle of 0 degrees when the velocity of the vehicle is greater than a maximum velocity;
setting the LR and RR eModules to a desired angle when the velocity of the vehicle is no greater than a minimum velocity; and
transitioning the angle of the LR and RR eModules linearly from the angle of 0 degrees to the desired angle when the velocity of the vehicle is greater than the minimum velocity and no greater than the maximum velocity.

7. A method, as set forth in claim 2, wherein determining, in the master controller, a required steering angle is further defined as:
calculating an ICR lateral line offset as a function of the determined velocity of the vehicle when the drive mode request is the 4WS drive mode;
calculating a steering angle when the determined position of the steering input device is not near 0 degrees;
calculating a coordinate position of the ICR as a function of the calculated steering angle;
calculating angles of the LF eModule, the RF eModule, the LR eModule, and the RR eModule;
calculating a wheel angle of the LF eModule, the RF eModule, the LR eModule, and the RR eModule; and
recording the wheel angle of the LF eModule, the RF eModule, the LR eModule, and the RR eModule to the memory in the master controller.

8. A method, as set forth in claim 7, further comprising:
calculating a caster wheel offset for the LF eModule, the RF eModule, the LR eModule, and the RR eModule; and
calculating wheel angle offsets for the LF eModule, the RF eModule, the LR eModule, and the RR eModule to align a center of each of the respective wheels to the ICR;
wherein calculating a wheel angle of the LF eModule, the RF eModule, the LR eModule, and the RR eModule is further defined as calculating a wheel angle of the LF eModule, the RF eModule, the LR eModule, and the RR eModule as a function of the alignment of the center of each of the respective wheels to the ICR.

9. A method, as set forth in claim 7, further comprising:
wherein calculated ICR lateral line is configured to intersect a center of the vehicle when the determined velocity of the vehicle is no greater than a minimum velocity;
wherein the calculated ICR lateral line is configured to intersect the center of the wheels of each of the LR eModule and RR eModule when the determined velocity of the vehicle is greater than a maximum velocity; and
wherein the calculated ICR lateral line is configured to transition linearly between center of the vehicle and the center of the wheels of each of the LR eModule and the RR eModule when the determined vehicle as a function of the linear transition between the determined velocity of the vehicle of between greater than the minimum velocity and no greater than the maximum velocity.

10. A method, as set forth in claim 2, wherein determining, in the master controller, a required steering angle is further defined as:
calculating an directional vector as a function of the determined position of the steering input device;
determining a normalized yaw angle of a joystick input device about a Z-axis;
calculating a steering angle when the determined normalized yaw angle of the joystick is less than a minimum angle or greater than a maximum angle;
calculating a steering radius from the center of the vehicle;
calculating a coordinate position of the ICR as a function of the calculated steering radius and directional vector;
calculating angles of the LF eModule, the RF eModule, the LR eModule, and the RR eModule;
calculating a wheel angle of the LF eModule, the RF eModule, the LR eModule, and the RR eModule; and
recording the wheel angle of the LF eModule, the RF eModule, the LR eModule, and the RR eModule to the memory in the master controller.

11. A method, as set forth in claim 10, further comprising:
calculating a caster wheel offset for the LF eModule, the RF eModule, the LR eModule, and the RR eModule; and
calculating wheel angle offsets for the LF eModule, the RF eModule, the LR eModule, and the RR eModule to align a center of each of the respective wheels to the ICR;
wherein calculating a wheel angle of the LF eModule, the RF eModule, the LR eModule, and the RR eModule is further defined as calculating a wheel angle of the LF eModule, the RF eModule, the LR eModule, and the RR eModule as a function of the alignment of the center of each of the respective wheels to the ICR.

12. A method, as set forth in claim 1, further comprising:
determining, in the master controller, a required steering angle of each of the plurality of eModules when the vehicle is determined to not be in motion and a park mode is selected as the driving mode; and
setting the eModules to an angle such that the vehicle does not move when pushed in any direction.

13. A method of controlling steering of a vehicle through setting wheel angles of a plurality of modular electronic corner assemblies (eModules), the method comprising:
activating a mode selection menu;
receiving a driving mode selected from the mode selection menu;
determining, by a master controller, the position of a steering input device;
determining, by the master controller, a velocity of the vehicle; transmitting a drive mode request corresponding to the driving mode to a plurality of steering controllers when the steering wheel is near center and the velocity of the vehicle is below a maximum velocity;
determining the wheel angle for each of the plurality of eModules as a function of the driving mode, the position of the steering input device, and the determined velocity of the vehicle; setting each of the eModules to an angle of 0 degrees and recording the angle setting of each of the eModules to a memory in the master controller, when the determined position of the steering input device is near 0 degrees; and transmitting the determined wheel angle for each of the plurality of eModules to a respective steering controller.

14. A method, as set forth in claim 13, further comprising:
determining, with at least one location device, a spot defined between objects adjacent the vehicle;
wherein determining the wheel angle is further defined as determining the wheel angle for each of the plurality of eModules as a function of the driving mode, the position of the steering input device, the determined velocity of the vehicle, and the spot defined between objects adjacent the vehicle.

\* \* \* \* \*